US011017356B2

United States Patent
Fehling

(10) Patent No.: US 11,017,356 B2
(45) **Date of Patent: *May 25, 2021**

(54) ENTERPRISE MESSAGE MANAGEMENT SYSTEM AND METHOD

(71) Applicant: Humana Inc., Louisville, KY (US)

(72) Inventor: Jeff Fehling, Louisville, KY (US)

(73) Assignee: Humana Inc., Louisville, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/380,342

(22) Filed: Apr. 10, 2019

(65) Prior Publication Data

US 2019/0236550 A1 Aug. 1, 2019

Related U.S. Application Data

(63) Continuation of application No. 15/150,352, filed on May 9, 2016, now Pat. No. 10,263,946.

(60) Provisional application No. 62/158,822, filed on May 8, 2015.

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 51/12* (2013.01)

(58) Field of Classification Search
CPC ......................... G06Q 10/107; G06Q 30/0251
See application file for complete search history.

(56) References Cited

U.S. PATENT DOCUMENTS 7,149,780 B2 12/2006 Quine et al.
8,738,702 B1* 5/2014 Belanger ............ G06Q 30/0261 709/205
2002/0085701 A1* 7/2002 Parsons .................. H04M 3/54 379/211.01
2003/0158905 A1* 8/2003 Petry .................... H04L 63/145 709/206
2004/0202117 A1 10/2004 Wilson et al.
2004/0267595 A1* 12/2004 Woodings ........ G06Q 10/06311 705/7.14
2007/0121650 A1* 5/2007 Ottavi .................. H04L 41/082 370/401
2008/0256201 A1 10/2008 Flowers et al.
2008/0278740 A1* 11/2008 Bird ...................... H04L 69/329 358/1.15
2009/0037471 A1* 2/2009 Mecilati ............... G06F 16/951
2010/0220585 A1 9/2010 Poulson et al.
2010/0281535 A1* 11/2010 Perry, Jr. ................ H04L 51/12 726/22
2012/0052871 A1* 3/2012 Cochran ............ G06Q 30/0261 455/456.1
2012/0191546 A1* 7/2012 Phelan ................ G06Q 10/107 705/14.67

(Continued)

*Primary Examiner* — Umar Cheema
*Assistant Examiner* — Tesfu N Mekonen
(74) *Attorney, Agent, or Firm* — Standley Law Group LLP

(57) ABSTRACT

A system and method are provided for managing a plurality of messages generated by an organization for delivery to various recipients. Said system and method being configured to optimize the messages to reduce duplication and conflicting message content based on the organizations collective messaging activity and the characteristics of the recipient.

10 Claims, 37 Drawing Sheets

(56) References Cited

U.S. PATENT DOCUMENTS

| | | | | |
|---|---|---|---|---|
| 2012/0221663 | A1* | 8/2012 | Liebenberg | H04L 67/306 709/206 |
| 2013/0007195 | A1* | 1/2013 | Rinard | H04W 4/90 709/217 |
| 2013/0086161 | A1 | 4/2013 | Avrahami et al. | |
| 2013/0144951 | A1* | 6/2013 | Viswanath | H04L 67/2823 709/204 |
| 2013/0288722 | A1* | 10/2013 | Ramanujam | H04L 51/26 455/466 |
| 2014/0310365 | A1 | 10/2014 | Sample et al. | |
| 2014/0378103 | A1 | 12/2014 | Cai et al. | |
| 2015/0310176 | A1* | 10/2015 | Chen | G16H 40/20 705/2 |

* cited by examiner

1902

ENTERPRISE MESSAGE MANAGEMENT SYSTEM AND METHOD

CROSS-REFERENCE TO RELATED APPLICATION

This application is a continuation of non-provisional application Ser. No. 15/150,352 filed May 9, 2016, which claims priority to provisional application 62/158,822 filed on May 8, 2015, the disclosures of each of which are hereby incorporated by reference in their entireties as if fully recited herein.

TECHNICAL FIELD

Exemplary embodiments of the present invention relate generally to a computerized system and method of managing communications directed to various recipients where the sender of such communications may be an organization with multiple groups providing content for the communications.

BACKGROUND AND SUMMARY OF THE INVENTION

Medium and large sized organizations that interact with the public must frequently provide communication to certain individuals and groups which may be internal to the organization, external to the organization, or a combination of both. These communications may be in several forms. For example, direct mailings, emails, mobile messages, social media messages, fax messages, and various types of voice communications. Voice communications in particular may take the form of interactive incoming call management systems (interactive voice response and automated call distributions systems) and outgoing voice communication messages, either automatically delivered or performed from a script by persons associated with the organization. In addition to the various communication methods used, these communications may be one of several forms, for example, outgoing mail may take the form of general marketing material or material specific to an individual or group of individuals.

These communications are often largely uncoordinated across an organization resulting in inefficient use of resources and irritation or confusion amount the recipients of such messages. For example, many organizations are formed from several divisions. Because of the different business focus of these divisions, the messages that they provide may differ, with the potential to cause confusion, overload the recipient, and result in unnecessary expenditures to deliver duplicate or inconsistent messaging. In some circumstances, communications to a general audience may contradict messaging targeted towards a specific person or group of persons.

Depending upon the organization, a significant portion of an organization's budget may be consumed by the cost of the aforementioned communications. As such, an organization may wish to deploy one or more analysis methods to gauge the effectiveness of various messages and means of communicating those messages. However, unless there is a method for coordinating the messaging taking place, it may become extremely difficult for such an analysis effort to determine exactly which messages are responsible for generating a desired response. For example, a health care provider or similar organization may wish to offer incentives to its members in order to encourage participation in an exercise program. The organization may communicate information about these incentives via a posting on social media at the same time as it communicates the very same information in a billing insert. In such an example situation, it may be very difficult to determine which of the communication methods utilized may have generated the greatest level of increase in interest among the members of the organization. Additionally, in such a promotion, an organization may be aware of a health condition that would prevent a recipient from participating in the exercise program promoted. In these circumstances, the organization may wish to avoid communicating such an exercise program to those recipients which the organization knows are unable to participate.

What is needed is a system and method for managing the various messaging produced by an organization and communicated to a group of recipients. Additionally, a system and method is needed to analyze the resultant messaging in order to gauge its effectiveness.

In an embodiment of the invention, a messaging management system may be comprised of computerized components, such as an incoming message depository, a message analysis function, a message fulfillment function, archiving functions, and analytical and reporting functions.

In certain embodiments, the messaging management system may comprise an interactive message depot that facilitates a user's creation and editing of a message while considering applicable organizational communications rules.

Embodiments of the invention may also include the capability to coordinate messaging across the various groups within an organization to help prevent the creation and delivery of redundant or conflicting messages.

Embodiments of the invention may also comprise watchlist functionality which permits a user to configure one or more watchlist functions whereby the user may be alerted when a message is directed to a particular group or type of recipients.

Embodiments of the invention may also comprise reporting functionality which may be configured to analyze and report on the messaging history with regard to one or more contacts or message topics.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
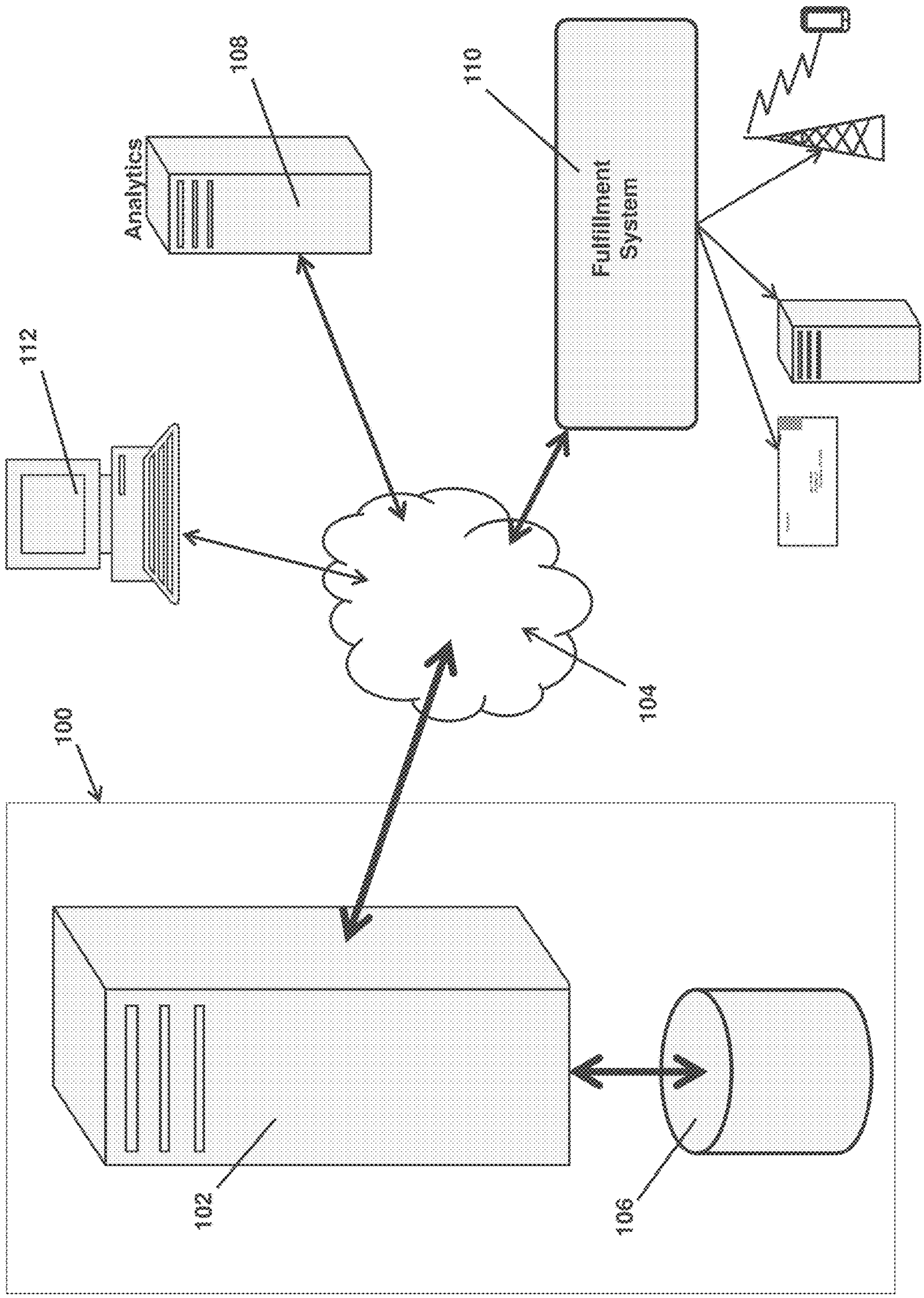
FIG. 1 is a block diagram of a computer system used in an embodiment of the invention.

Embodiments of the invention may be formed using computer systems that are in communication with the organization's computer network and also in communication with various systems which provide the formatting and delivery of the message to be communicated. As is illustrated in FIG. 1, such a computer system 100 may comprise one or more computer servers 102, an interface to a network 104, one or more databases 106 that comprise information such as, but not limited to, subscriber lists, business rules, message temples, and message history. In addition, one or more analytics engines 108 may be in communication with the computer system 100. Although illustrated as a standalone device, in certain embodiments of the invention, these analytics engines 108 may be configured virtually and housed in a computer server including the server 102 of the computer system 110 illustrated herein. In embodiments of the invention, the analytics engines 108 may provide the analysis and reporting used to enable the organization to determine the effectiveness of the various communications generated using the system. In embodiments of the invention, the computer system 100 may be in communication with various fulfillment systems 110. These fulfillment systems 110 may be internal to the organization or may be provided by service entities outside of the organization. Examples of such systems may include, but are not limited to, email generation and delivery services, social media web sites or service providers, printers, direct mail services organizations, incoming call systems which provide prerecorded messages to callers, and voice message providers that may generate and deliver outgoing voice message calls according to recipient lists provided by an organization. In addition to the other components illustrated, such a system may also comprise one or more computers 112 in communication with the rest of illustrated system. These computers 112 may be used to provide an interface for use by operators of the system. Additionally, these computers 112 may receive reporting produced by the server 102 of the claimed where such reporting includes an analysis of the communications performance and effectiveness metrics monitored by the server 102.

Figure 2:
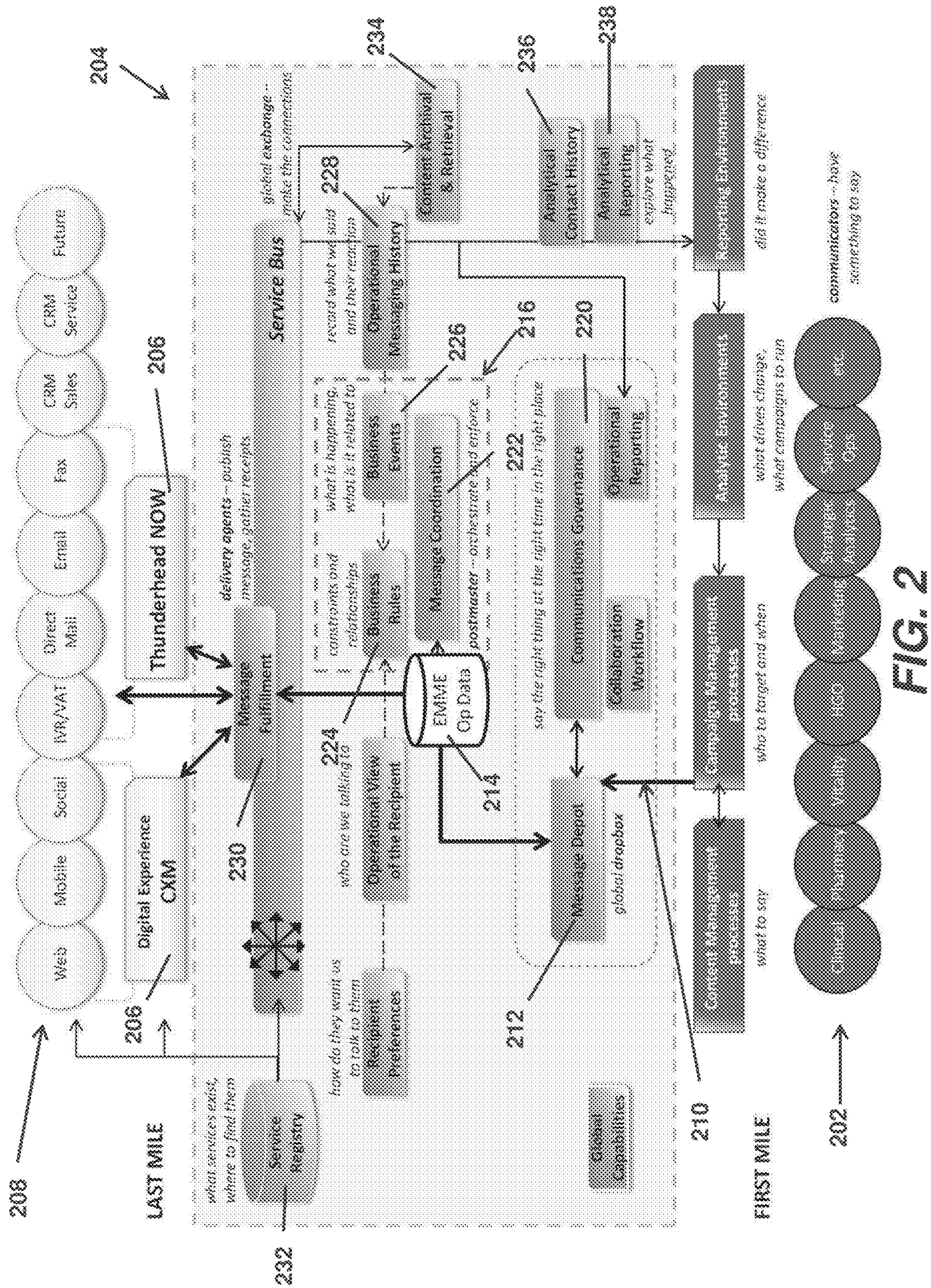
FIG. 2 is a block diagram of the major components of the message management system.

A diagram of the major components used in an embodiment of the invention is shown in FIG. 2. As is illustrated, various components of the organization 202 may have a need to communicate to various groups of message recipients. These organizational components may feed message content into the message management system 204 designated by those components found inside the dashed line. Depending upon the type of message produced, various communications systems 206 may be employed to deliver the message to the intended recipients. As is illustrated, a message may take one or more forms 208. Example forms may include, but are not limited to, web postings, mobile messaging, inbound voice messages (i.e. hold music), email, fax, postal service mail, customer resource management messaging, and social media messages. In addition to a connection to one or more message delivery systems, an embodiment of the invention may be configured to have an interface with the organization 210. This interface may be a graphical user interface which is configured to allow for direct human interaction with the message management system 204. Other interface methods may include application program interface (API) calls or other machine to machine interface methods. Using such interfaces, the message management system 204 may be invoked from software programs which generate message content. Such an interface may comprise a message depot 212 which receives message information and content from the various parts of the organization 202. Message data may be input using various data formats such as comma-separated value (CSV) files. Message content may also be transferred using formats such as TXT, XML, or XSA. From the message depot, a message may be stored in a database 214 to await further action from the message management system 204. A message analysis portion of the invention 216 may apply business rules and consider other business events to determine the suitability of the message content after these rules and events are applied. Such an analysis portion may be configured using an analysis engine in communication with business rules and events databases. Should such analysis detect message content or delivery characteristics that are not in conformance with said business rules, the user of the message management system may be contacted in order to correct any message deficiencies or to override the message management system with regard to the suitability of the message. When a message has been analyzed and is ready for delivery, the message may be provided to a fulfillment system 230. This fulfillment system processes the messages for delivery, selecting one or more communications systems 206 as appropriate for the type of message or recipient. The main components of the message management system 204 will now be described in greater detail.

Message Depot

As is illustrated by FIG. 2, the message depot 212 is an input repository which receives proposed messages from the various groups 202 of an organization. In the embodiment shown in FIG. 2, the message depot 212 may comprise a connection to an organization's communications governance rules 220. These rules may be applied to a message to verify that the message content conforms to standards established by the organization. In certain embodiments of the invention, a user may be required to modify the content of a message in order to comply with corporate governance rules 220 before it is accepted by the message depot 212 for further processing by the message management system 204. Such a configuration may speed the process of submitting a message for delivery as a user may interact in real-time or near real-time with the message depot in order to receive feedback at or about the time a message is submitted to the system. The message depot may be configured to allow a user to associate a message with a particular communication vehicle. For example, if a user wishes to send a short message that is time sensitive, that user may elect to send the message via text message. In such an example, the message management system may automatically restrict the message length and apply a set of corporate governance rules which are specific to text messaging. For example, such rules may limit the sending of text messages to a time period equivalent to normal business hours where the recipient is located. In an embodiment of the invention, a user may also override fulfillment data for one or more messages. For example, in certain embodiments of the invention a user may provide an update to a recipient's address from the message depot.

In certain embodiments of the invention, the message depot may be able to receive and act upon metadata collected from the message. Metadata may comprise message topic, message format, recipient characteristics, applicable corporate governance rules, approval information, delivery information, and time/date information related to message creation and delivery. Metadata may also comprise message effectiveness data based on recipient feedback or message response rate information. This metadata may be stored in a central repository that is accessible by other information management systems that may exist within the organization.

In embodiments of the invention, the message depot may comprise a batch contract which may be used to request fulfillment to one or more recipients. In certain embodiments of the invention, this batch contract may be interactive to allow the user to request delivery (which may be referred to as fulfillment) to the one or more desired recipients. In some embodiments of the invention, the message depot may provide a tracking reference identifier. In these embodiments, this tracking reference identifier may be a sequential, non-repeating number that may be indicative of regulatory status and be searchable. The tracking number may allow a user to identify which message management system has received or processed a particular message. In addition, the tracking number may be used to identify a current status of the message. For example, if the message has been completely processed by the management system but has not been delivered to a fulfillment system, the tracking number may allow the user to identify that fact and take follow-up actions that may be necessary to cause one or more fulfillment systems to act upon the message. The message management system may be configured to receive delivery (fulfillment) data from various vendors that provide production and delivery services of messages provided by the messaging management system. This delivery data may be associated with the tracking number assigned by the messaging management system 204. In this manner, a user may be able to easily manage a variety of different messages using the tracking number to identify each message. In addition to using tracking numbers, users of the messaging management system may be able to search for messaging information using an identifier related to a recipient or class of recipients. Example recipient classes may be, but are not limited to, customers, employers, brokers, employees, health plan or other group members or service providers.

Figure 3:
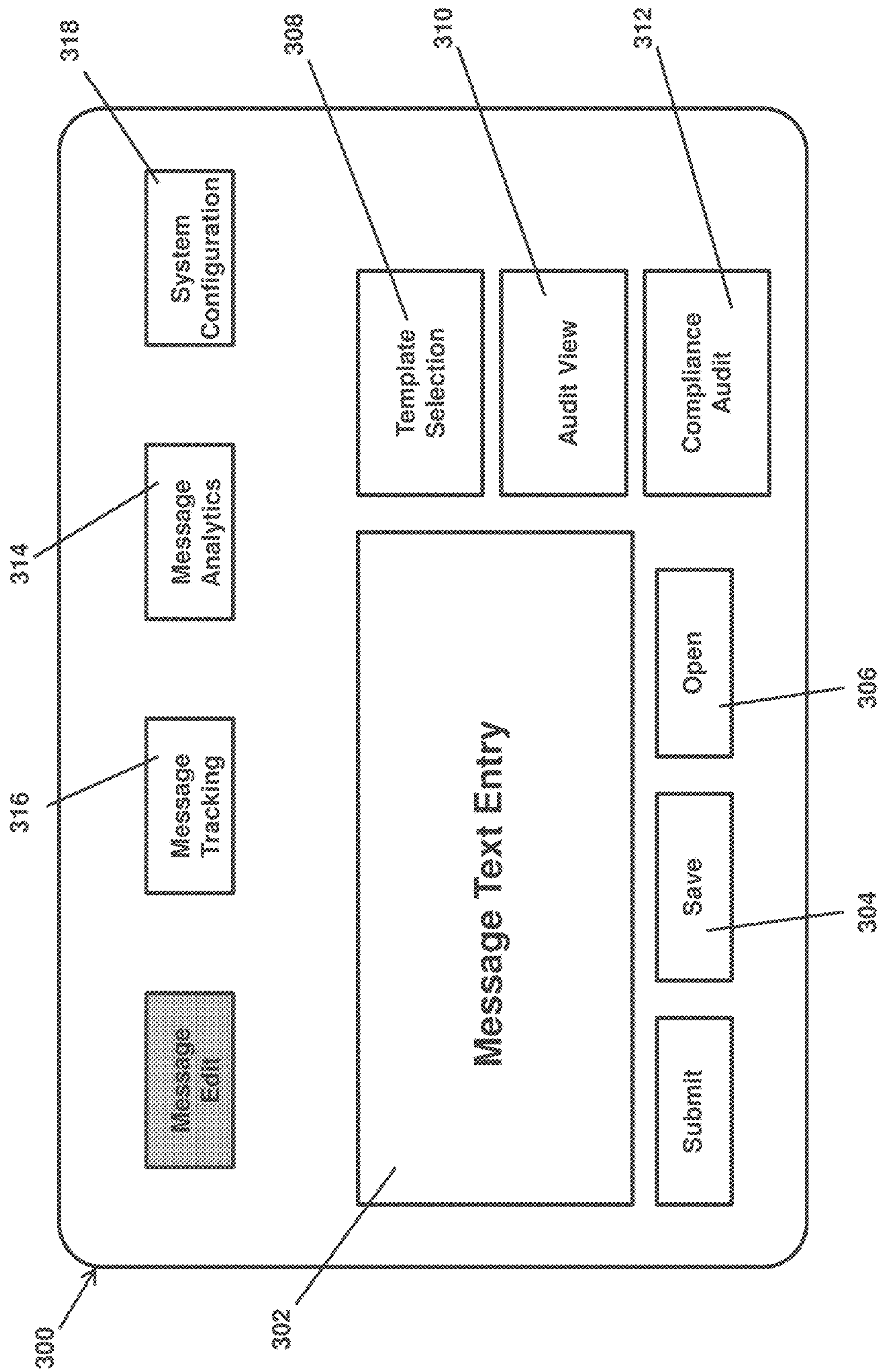
FIG. 3 is a representative user interface of an embodiment of the invention.
Figure 4:
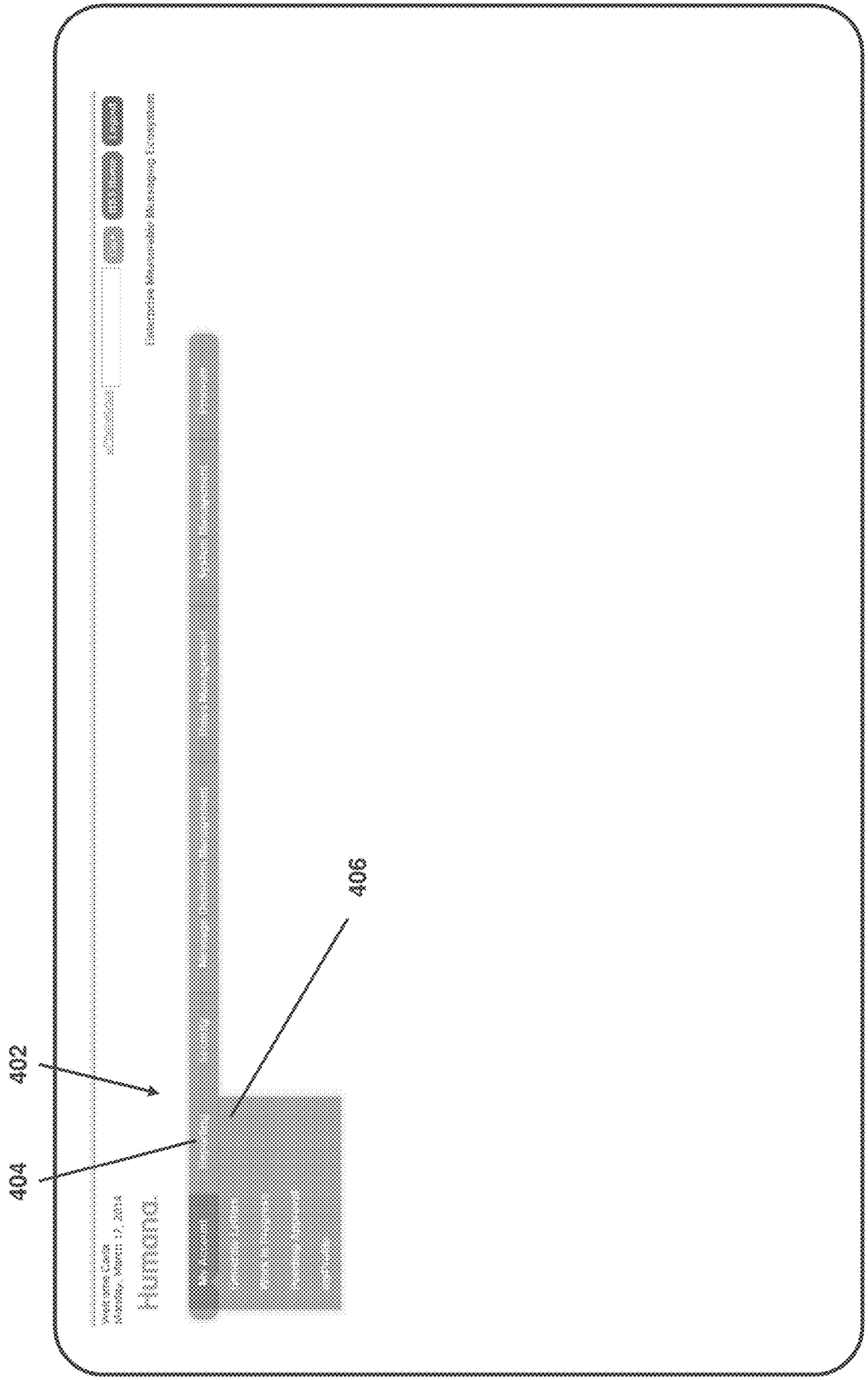
FIG. 4 is a menu used in a user interface of an embodiment of the invention.
Figure 5:
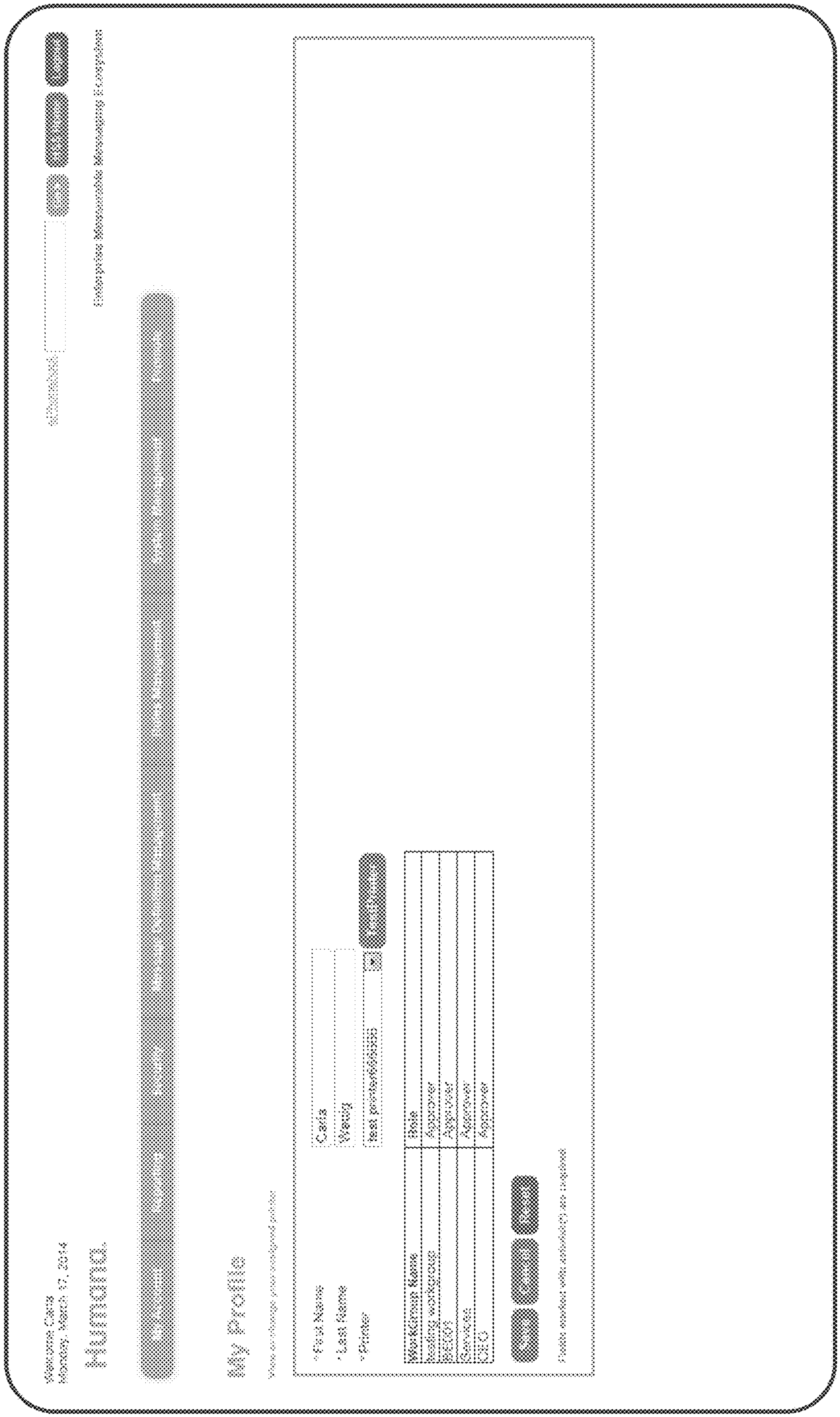
FIG. 5 is an example of a user interface configured to edit a user's profile information.
Figure 6:
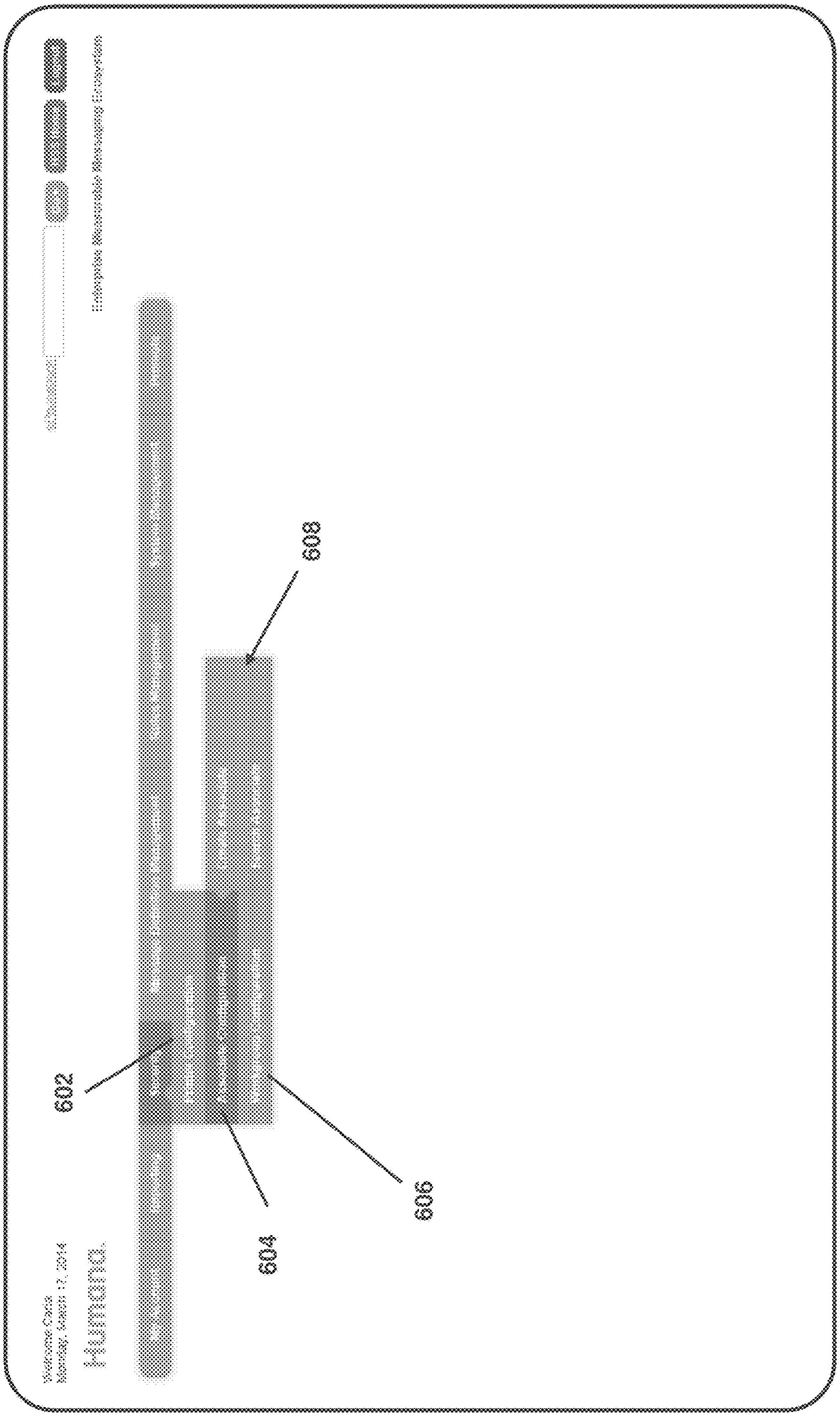
FIG. 6 is a menu used in a user interface of an embodiment of the invention.
Figure 7:
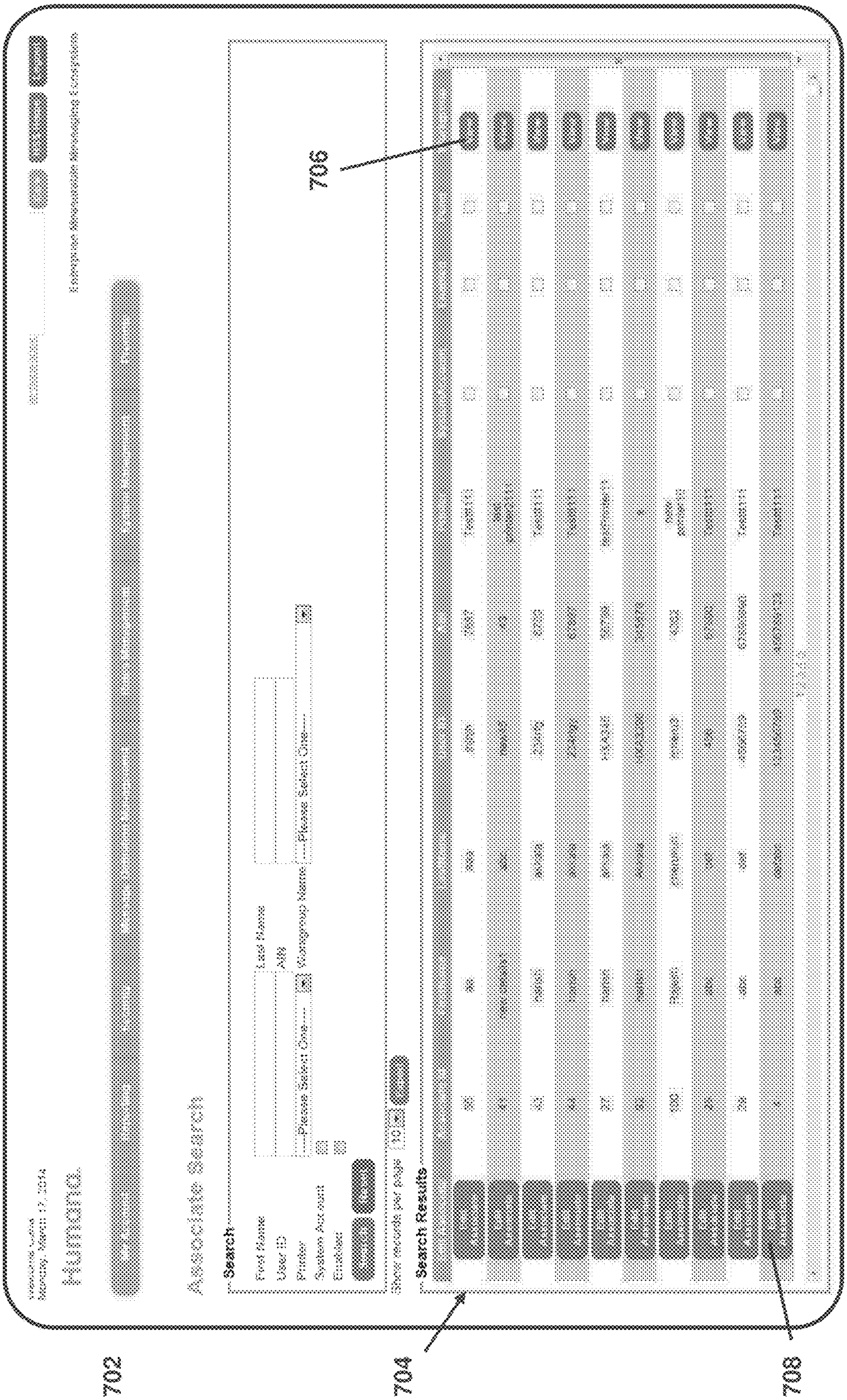
FIG. 7 is a user interface used to search for configured associates in an embodiment of the invention.
Figure 8:
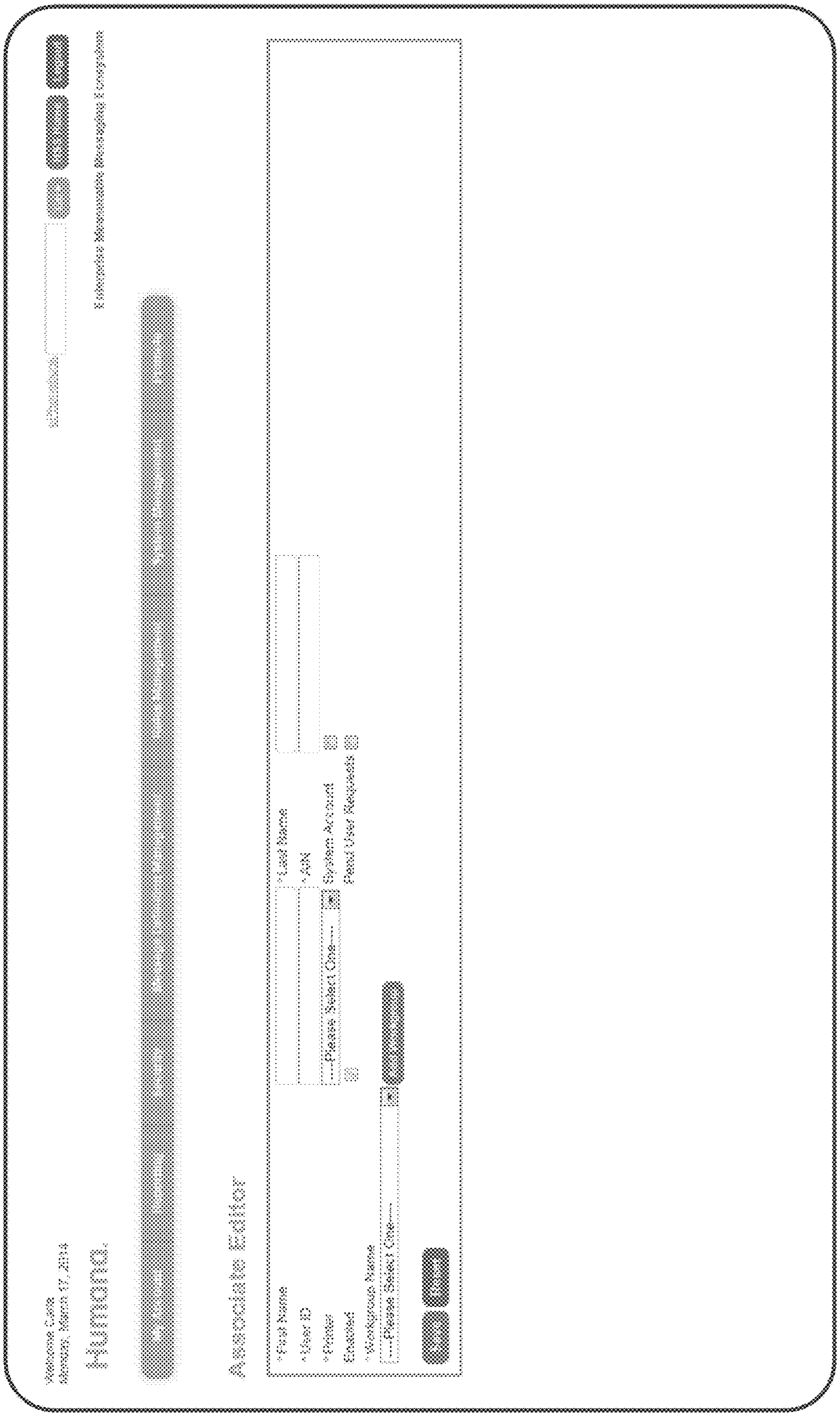
FIG. 8 is a user interface used to edit the profiles of associates in an embodiment of the invention.
Figure 9:
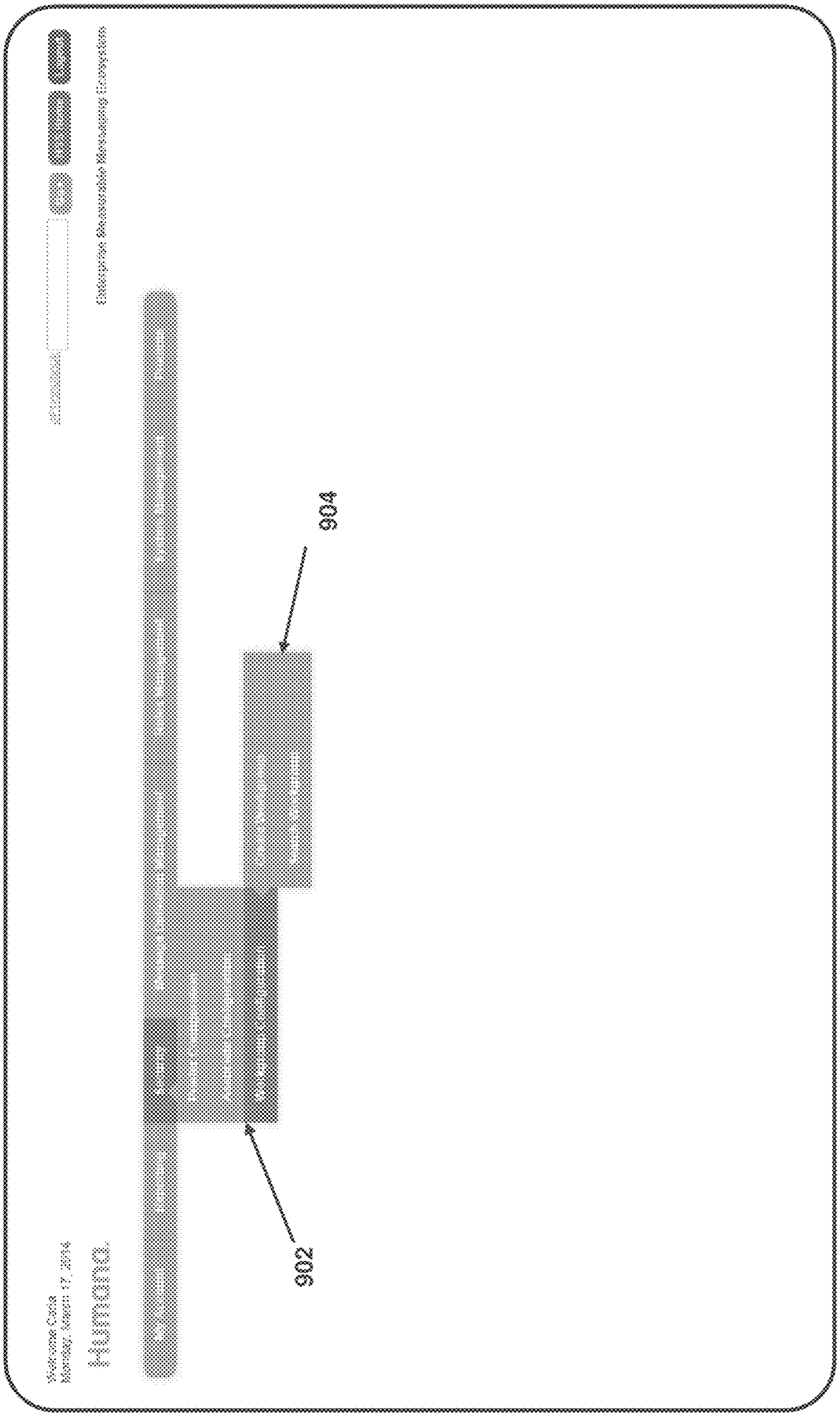
FIG. 9 is a menu used in a user interface of an embodiment of the invention.
Figure 10:
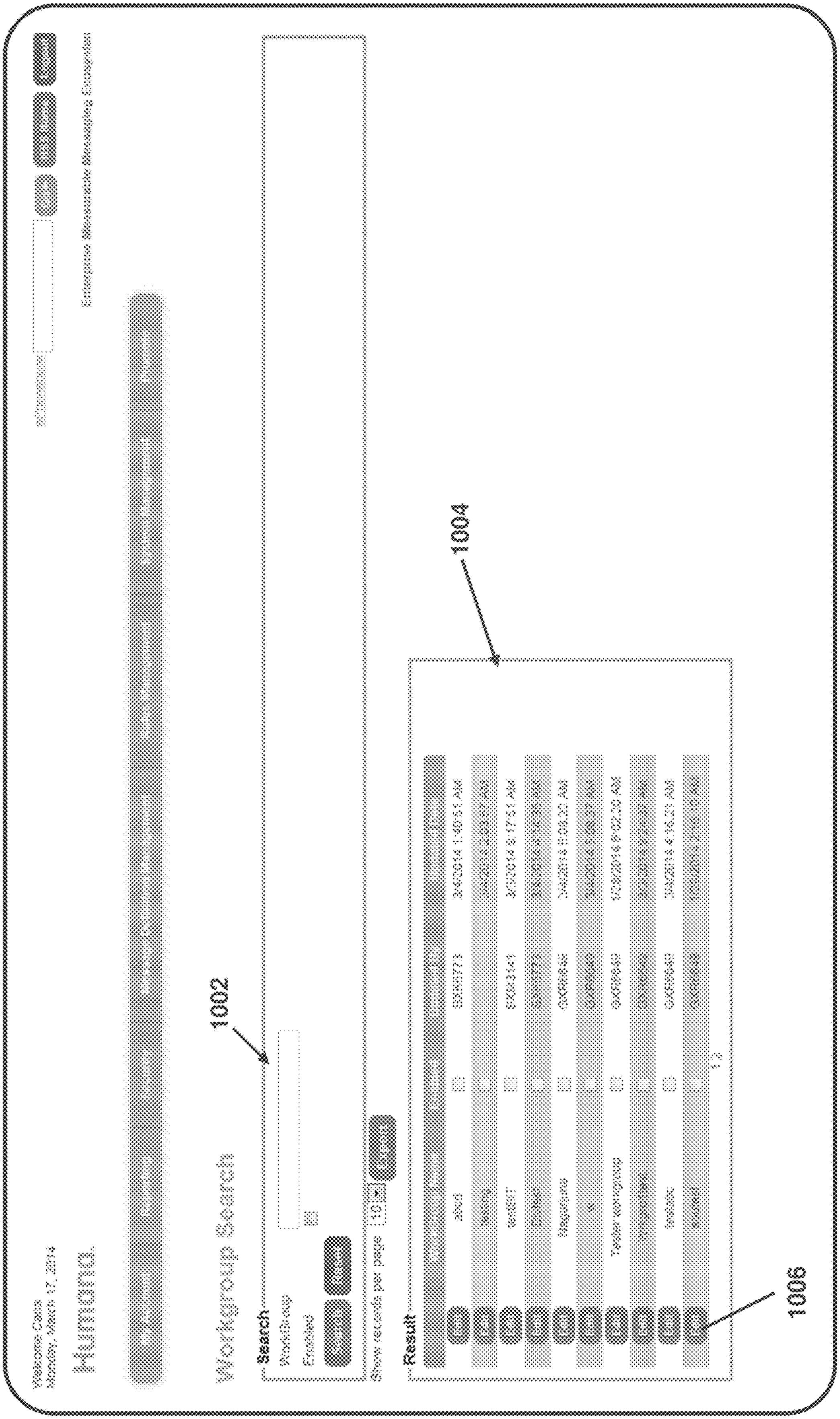
FIG. 10 is a user interface configured to search for workgroups in an embodiment of the invention.
Figure 11:
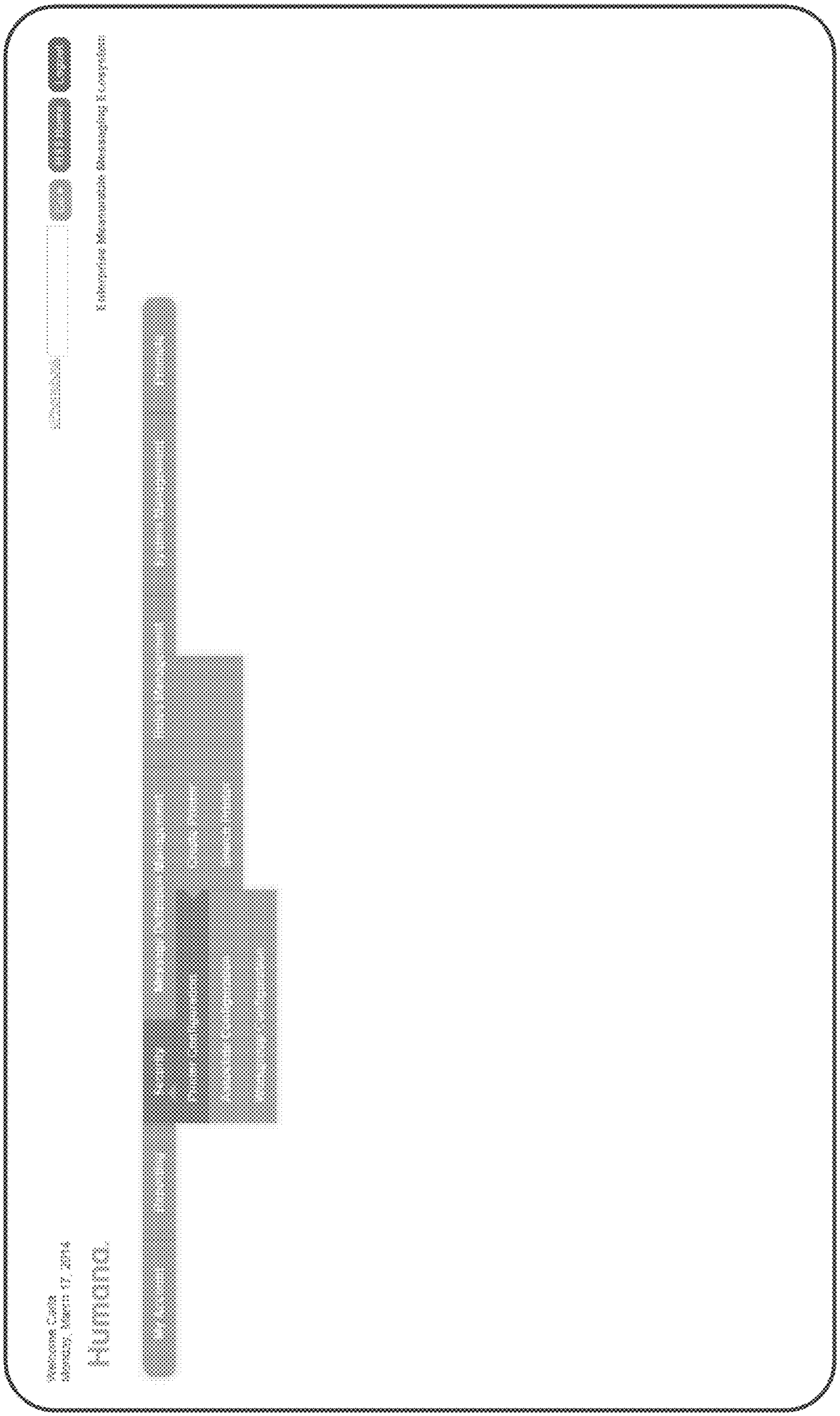
FIG. 11 is a menu used in a user interface of an embodiment of the invention.
Figure 12:
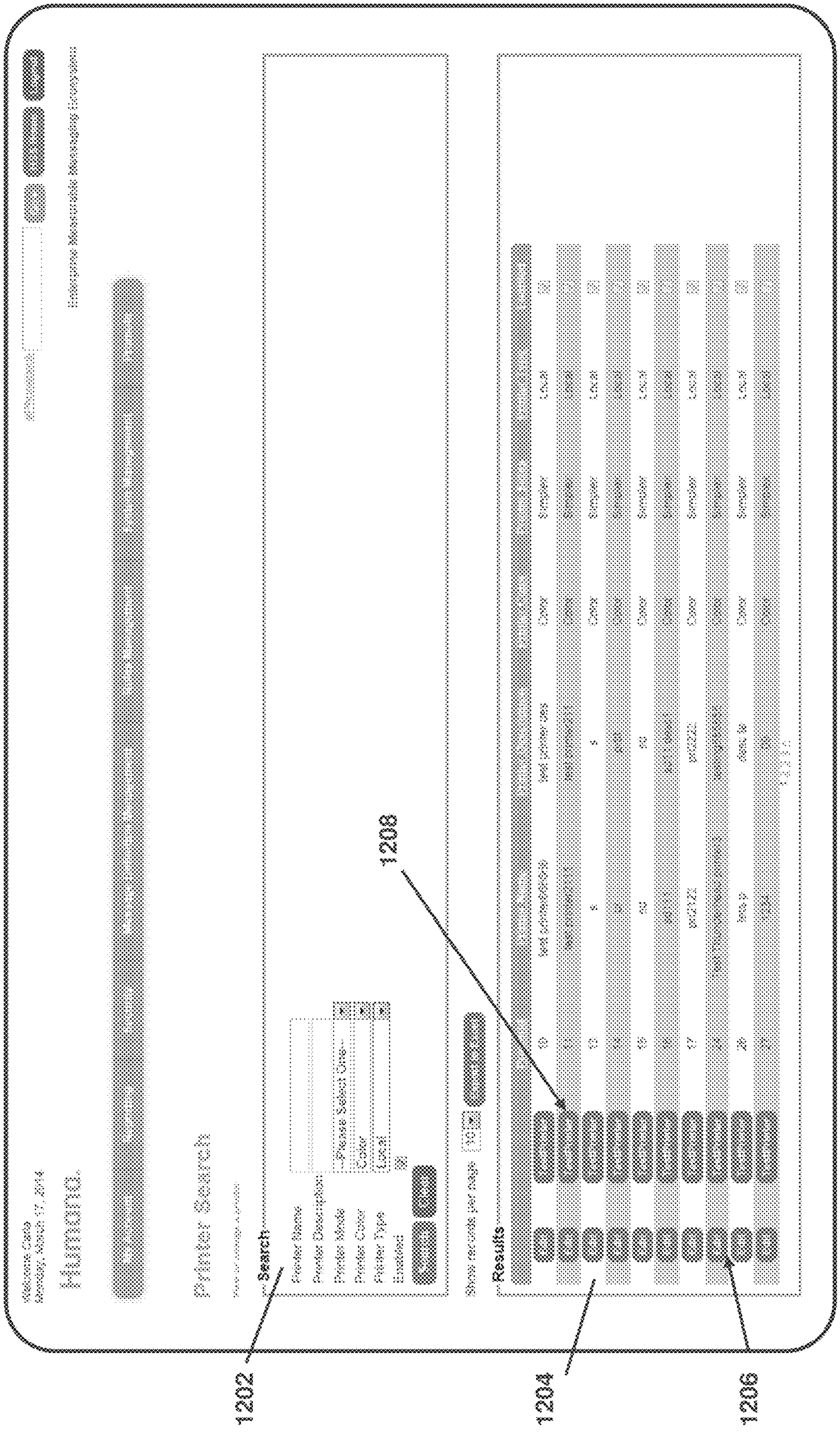
FIG. 12 is a user interface configured to search for configured printers in an embodiment of the invention.

As is illustrated in FIG. 3, an embodiment of the invention may comprise a message creation user interface 300 that permits a user to perform various message creation functions with regard to the messaging management system. For example, as illustrated at 302, a user may enter the content of a proposed message into a text entry field. This type of user interface may be presented to a user who is in communication with the message management system 204 directly as illustrated by the interface device 112 of FIG. 1 or by using a remote interface method. Referring to FIG. 4 which illustrates a user interface of an embodiment of the invention, a user may select a dropdown menu 402 which allows the user to edit their user profile. An example of a user profile screen is illustrated in FIG. 5. As is illustrated in FIG. 6, in addition to editing their user profile, a user with sufficient authority may be permitted to edit system configuration parameters such as printers 602, associates 604, and workgroups 606. As is illustrated, a user may select a dropdown 608 to add (create) or search associates. Associates may be added and given permissions to access various system resources such as printers and the ability to create and send messages using the system. In addition to creating associates, a user may be able to search associates that have already been added to the system using an associate search screen like the one illustrated in FIG. 7. As is shown, a search parameter entry area 702 may be presented to the user. After one or more search parameters are entered, a user may cause the system to perform an associate search whereby the search results are displayed in a results field such as what is illustrated at 704. The user may then scroll through the returned results and view 706 or edit 708 one or more of the displayed users. In certain organizations, there may be permissions that are defined by work function. As is illustrated in FIG. 8, a user of the system may edit associate information. As is illustrated in FIG. 9, a menu dropdown 902 may also comprise workgroup creation and search functions 904. As is illustrated in FIG. 10, a user may search for existing workgroups by entering workgroup information into a search parameter entry area 1002 and cause the system to search for workgroups based on that entry. The results of the workgroup search may be displayed in a search results display similar to what is illustrated at 1004. A user may select and edit 1006 a workgroup from such a display. Editing a workgroup may comprise adding or subtracting members or may comprise editing the permission of the entire group. For example, a workgroup tasked with communication with internal resources (such as associates or management) may have message permissions limited to those internal groups while a second workgroup responsible for communication with persons or groups outside of the organization may have permissions to communicate with those external groups but also to internal groups in order to keep those internal groups apprised of what is being communicated externally. Referring to FIG. 11, a user may also create or search for printers available to the system. An example of a printer search user interface is illustrated in FIG. 12. As is shown, a user may search for a printer by entering search parameters into a printer search dialog box 1202. Search results may be displayed in a results display 1204 which may also comprise editing 1206 and test functionality 1208.

Figure 14:
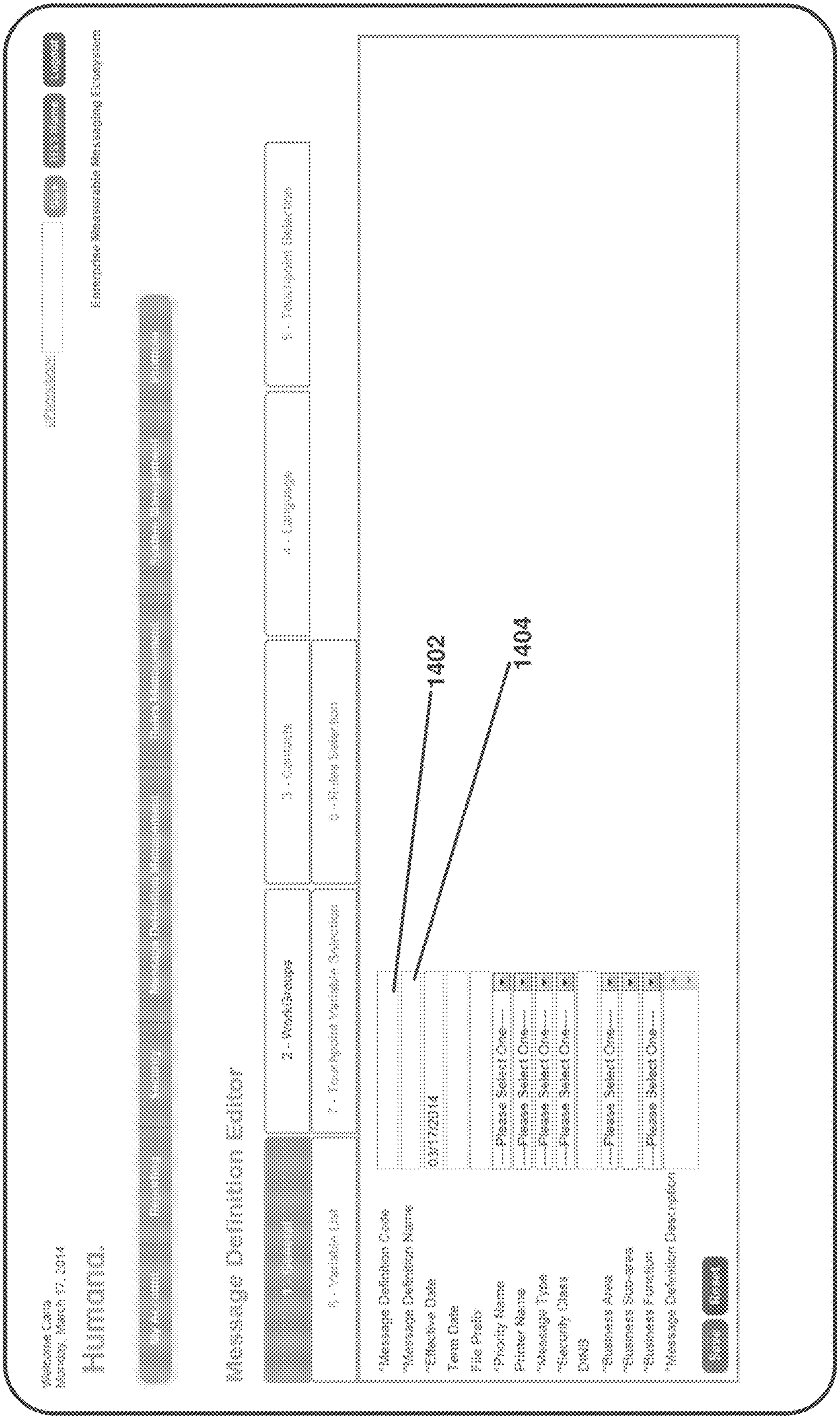
FIG. 14 is a user interface used to edit a message definition in an embodiment of the invention.
Figure 15:
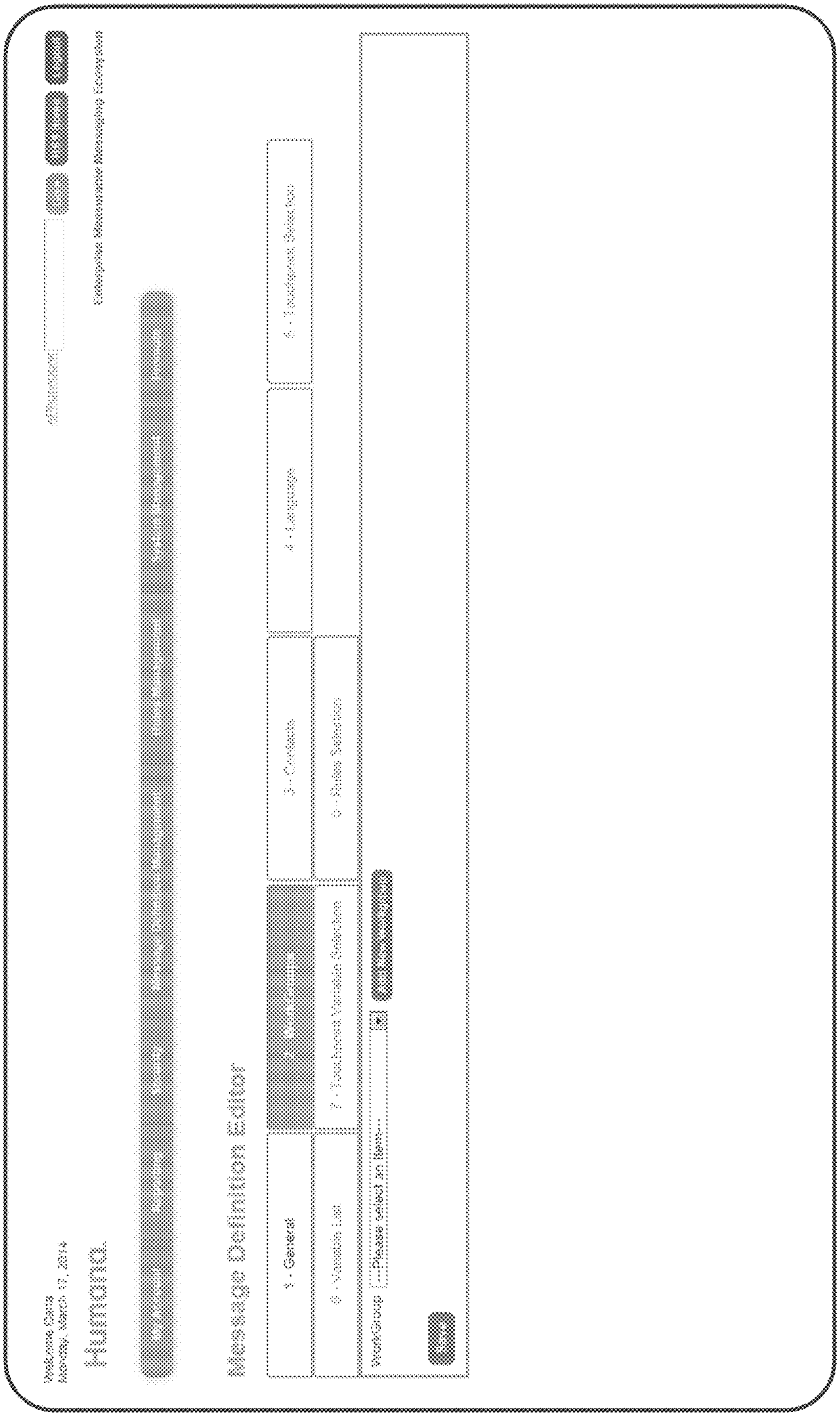
FIG. 15 is a user interface used to edit a message definition in an embodiment of the invention.
Figure 16:
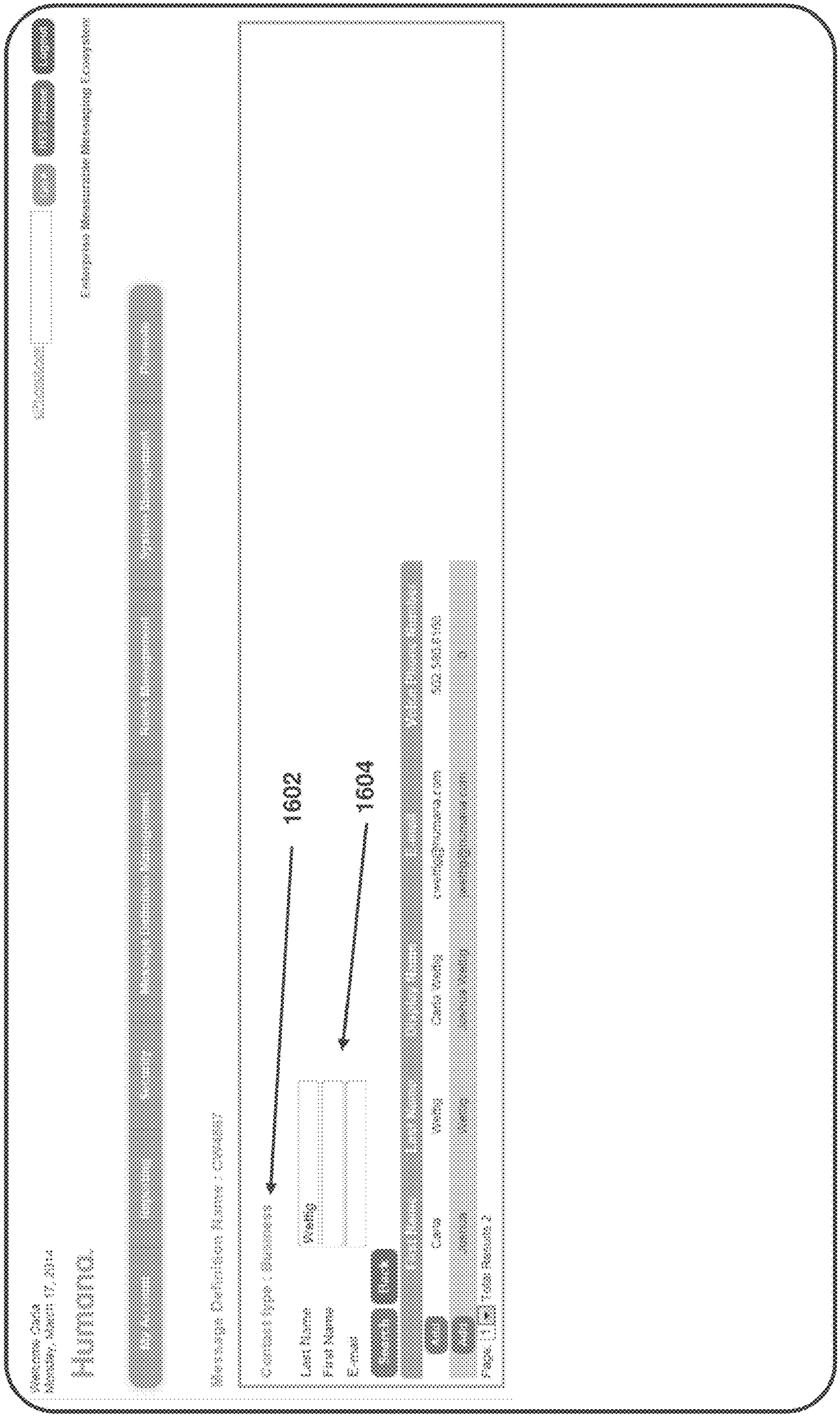
FIG. 16 is a user interface used to edit a message definition in an embodiment of the invention.
Figure 17:
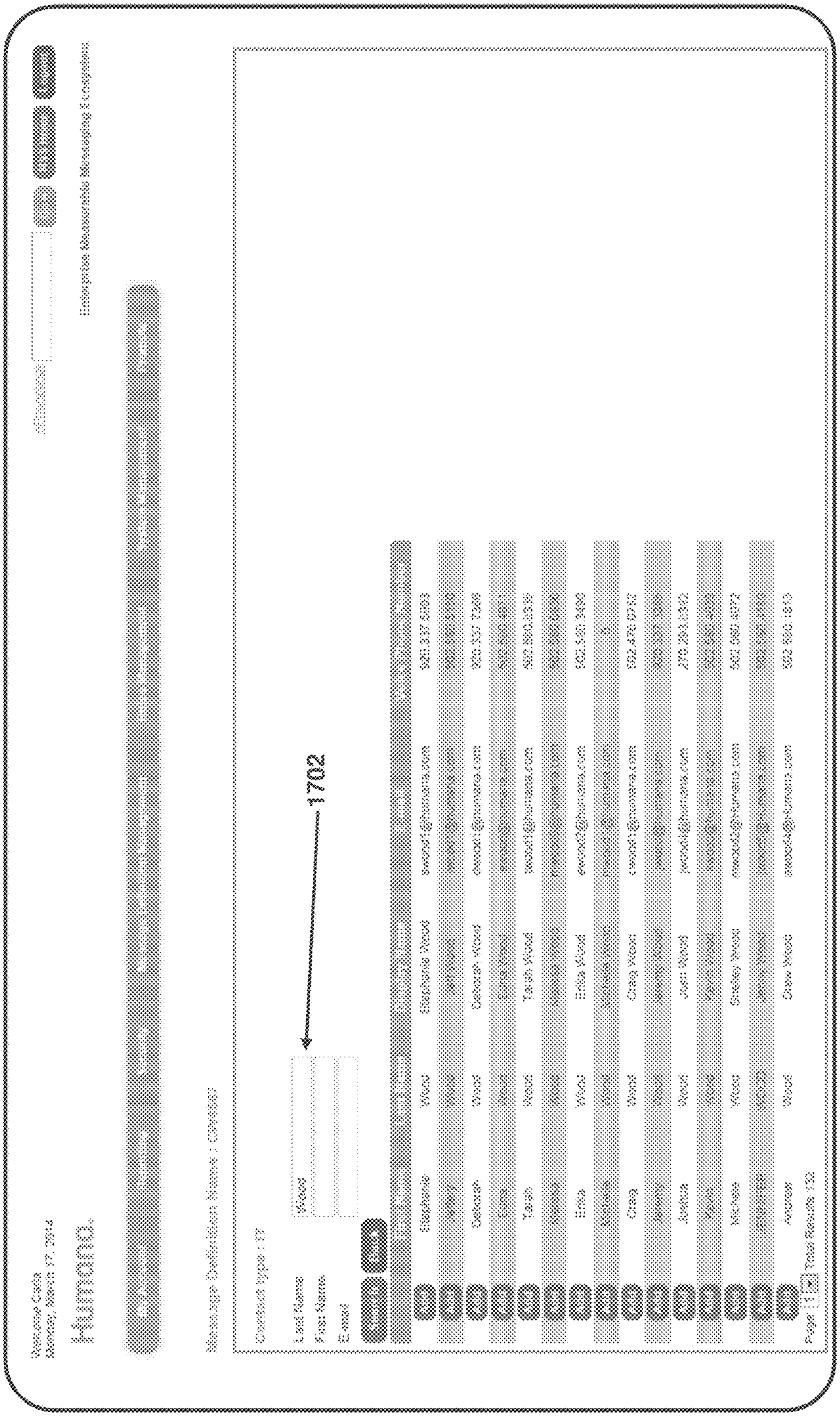
FIG. 17 is a user interface used to edit a message definition in an embodiment of the invention.
Figure 18:
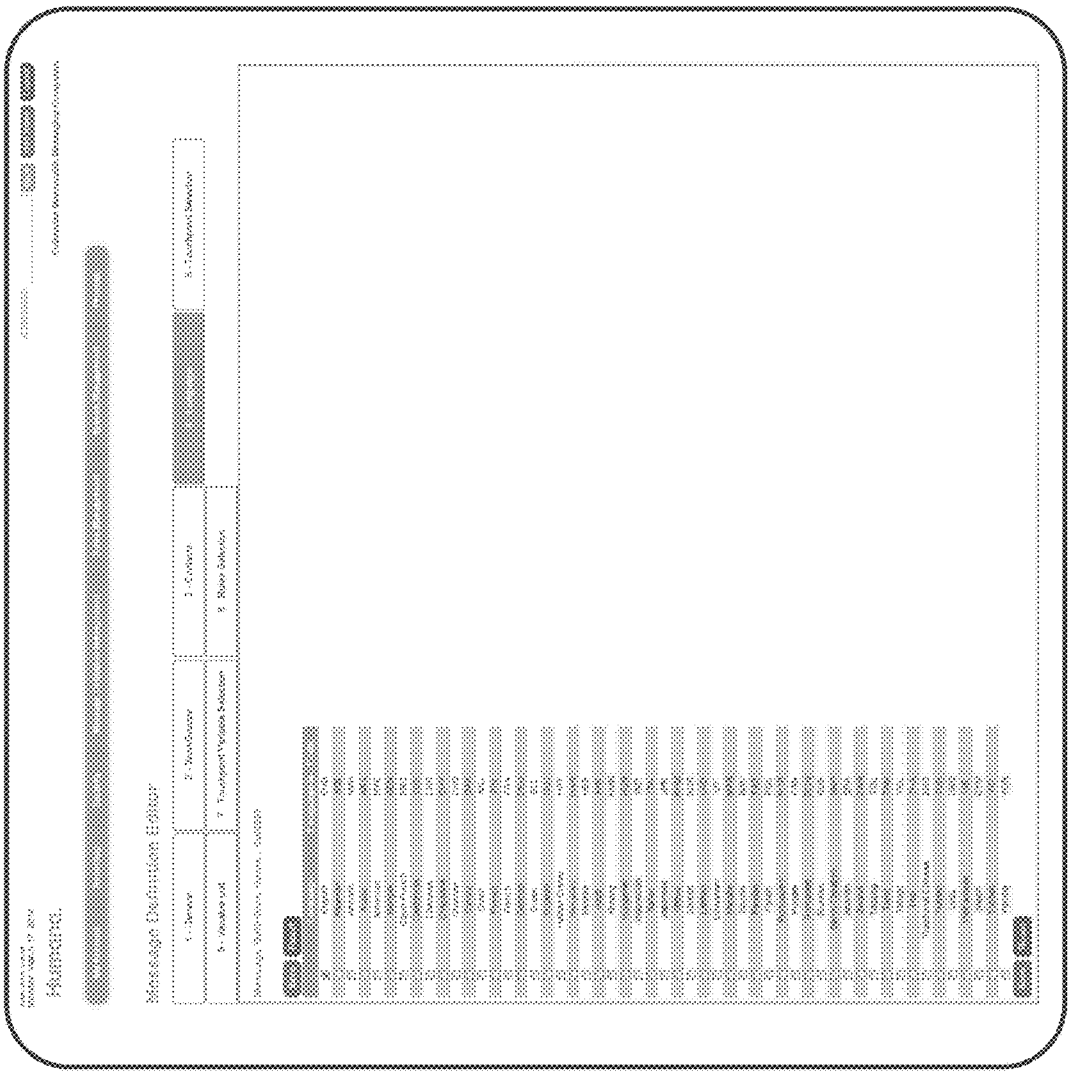
FIG. 18 is a user interface used to edit a message definition in an embodiment of the invention.
Figure 19:
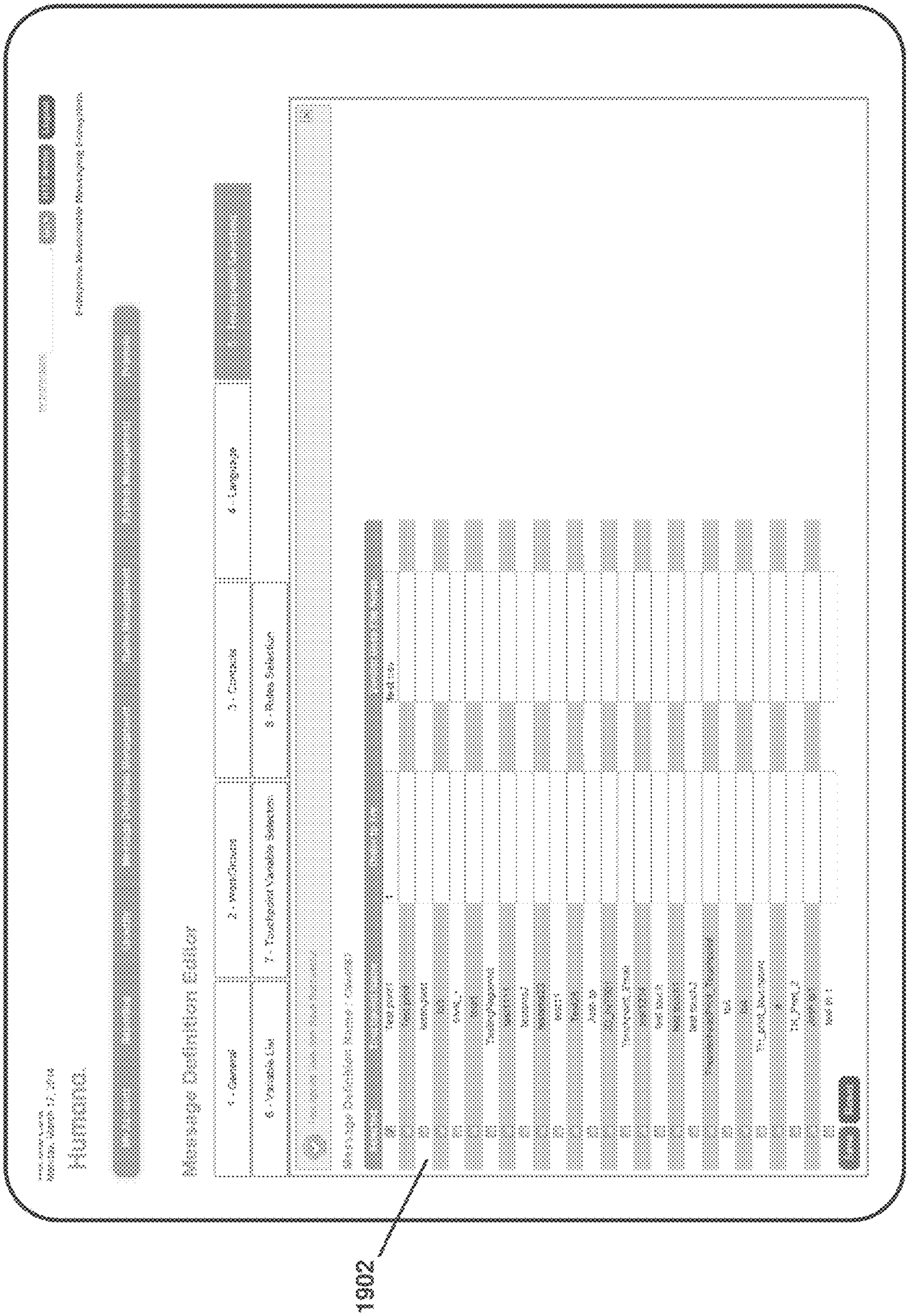
FIG. 19 is a user interface used to edit a message definition in an embodiment of the invention.
Figure 20:
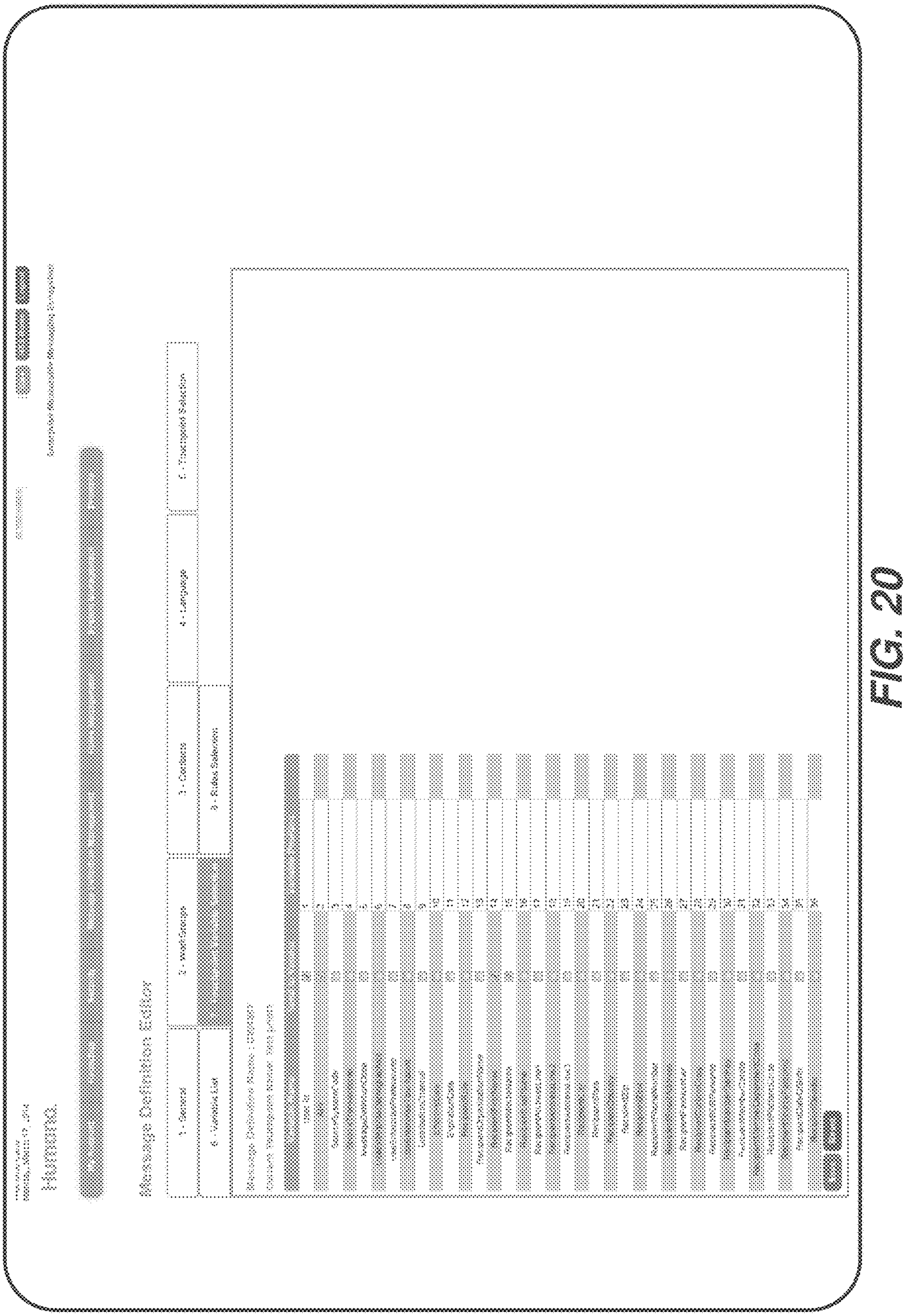
FIG. 20 is a user interface used to edit a message definition in an embodiment of the invention.
Figure 21:
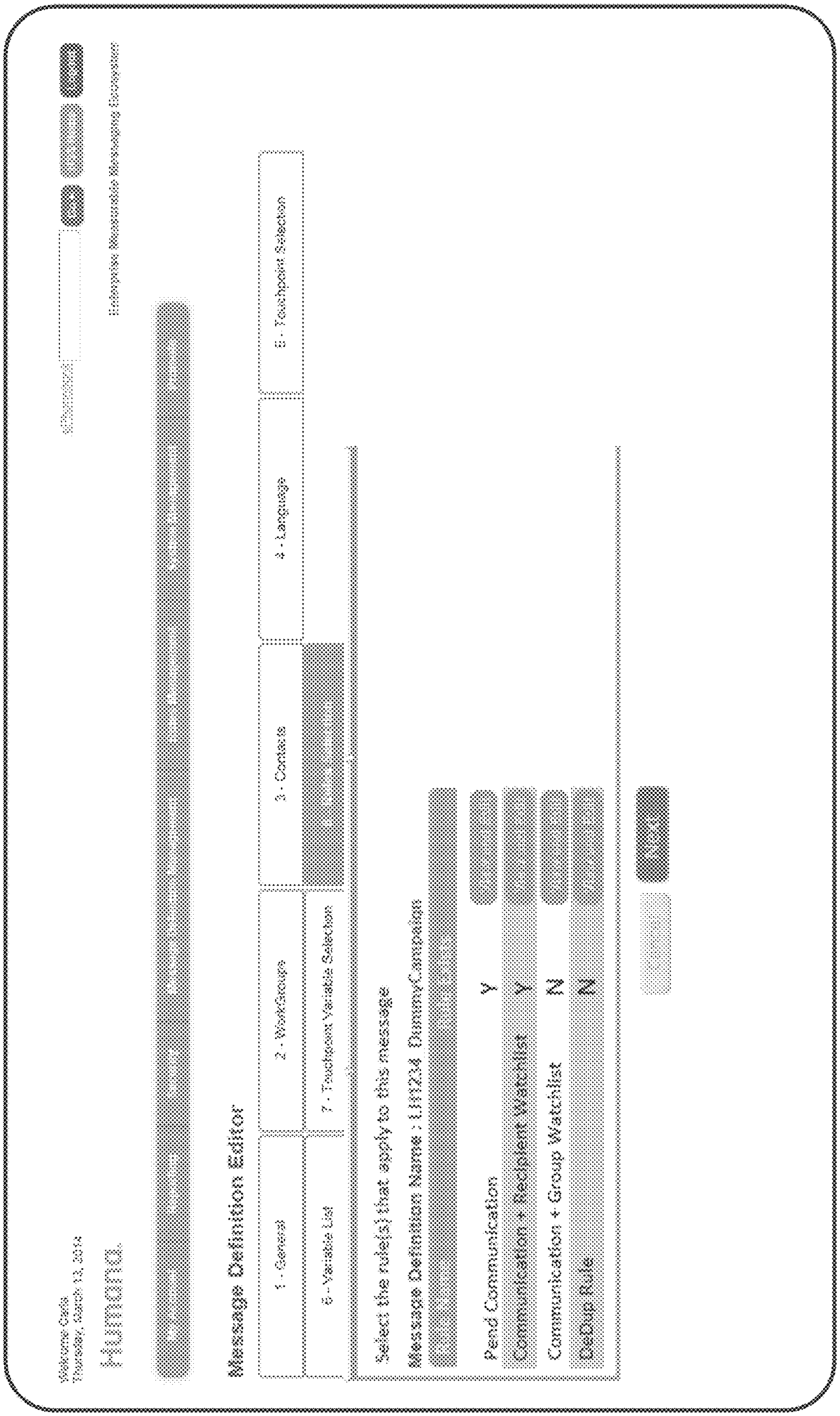
FIG. 21 is a user interface used to edit a message definition in an embodiment of the invention.
Figure 22:
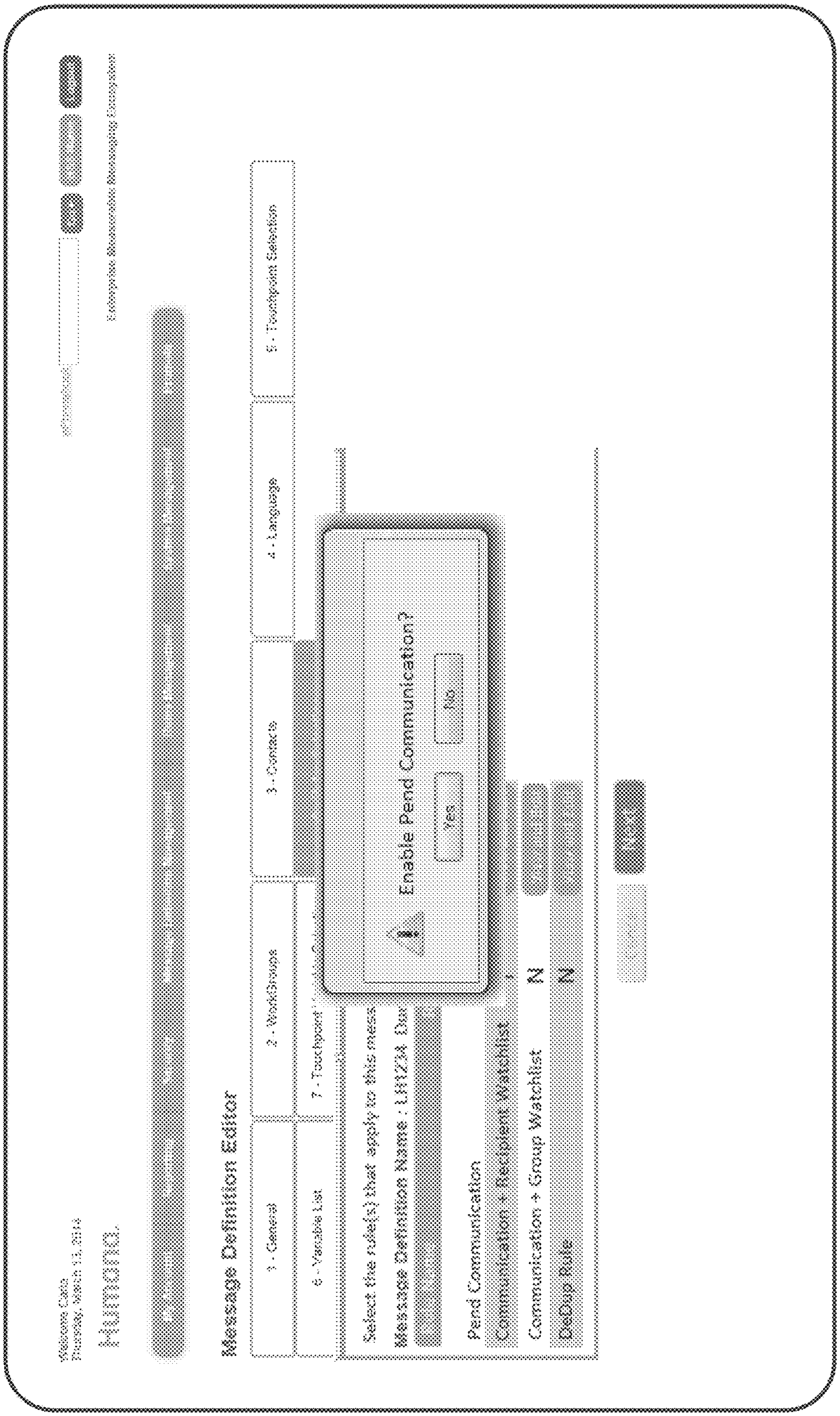
FIG. 22 is a user interface used to edit a message definition in an embodiment of the invention.
Figure 23:
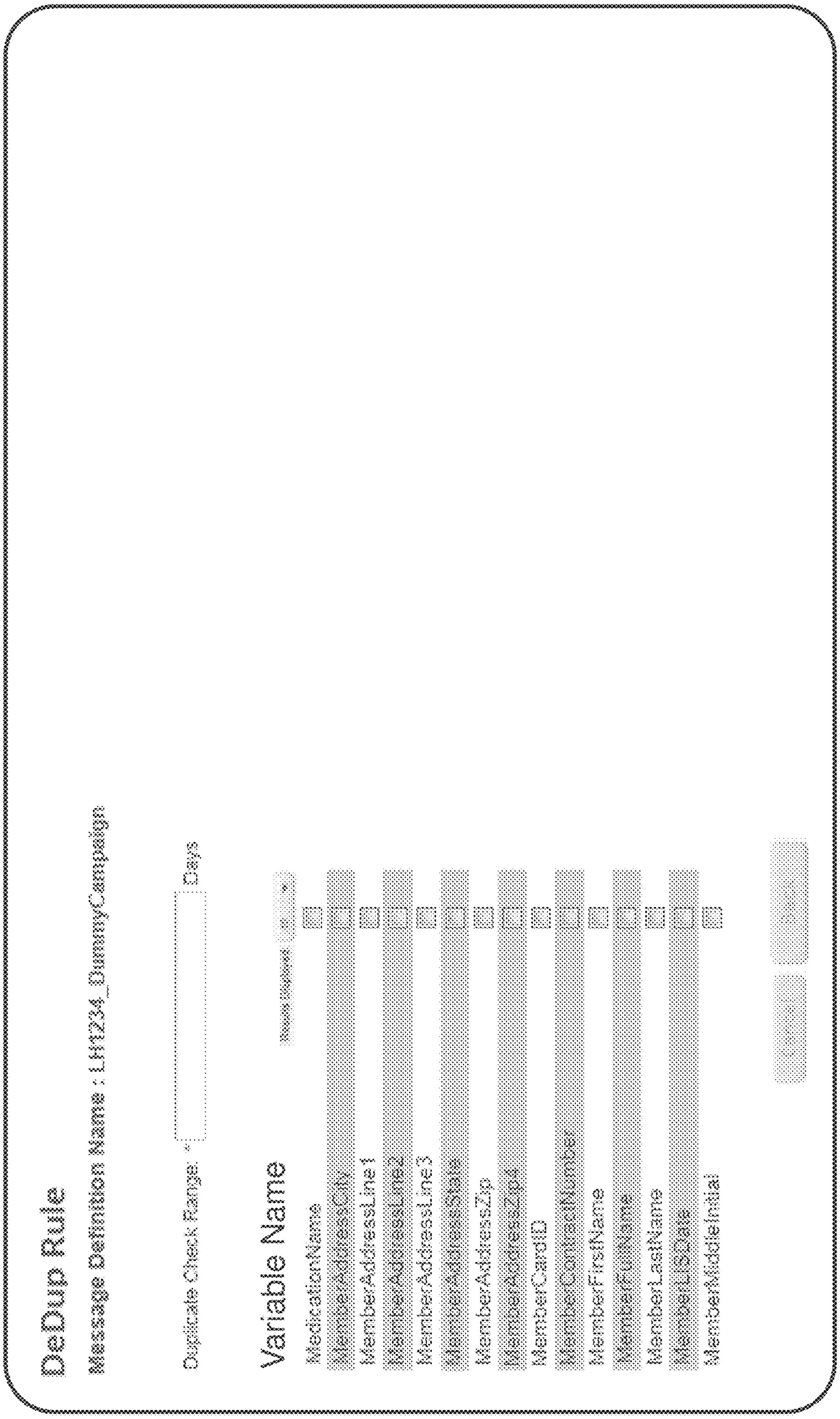
FIG. 23 is a user interface used to edit a message definition in an embodiment of the invention.

In embodiments of the invention, messages may be created that can be based on defined types. A user may create new definitions or search exiting definitions as illustrated in the dropdown 1302 of FIG. 13. Upon selecting a create message definition option, a second user interface may be displayed to the user. An example of such an interface is the message definition editor interface illustrated in FIG. 14. As is shown, a user may be presented with data entry fields to enter a message code 1402 and definition name 1404. Various other message definition input fields may be presented to the user as they create or edit a message definition. In addition to basic message definition information illustrated in FIG. 14, a user may also select a workgroup to be associated with the message definition as illustrated in FIG. 15. After workgroups have been assigned, contacts may be assigned to the message definition. After a contact editing selection has been made, a user may be presented with contact search function. Such a function is illustrated in FIGS. 16 and 17. As is illustrated at 1602 and 1702, contacts may first be limited by contact type. In order to add contacts to a message definition, a user may be presented with a search entry field 1604. As is illustrated, a user may enter a name and be presented with a list of selectable contacts based on the search entry information provided by the user. In the example of FIG. 16, a user has entered a name and is provided with a list of results based on that name. The user may add one or more of the presented names to the contacts portion of a message being defined. As was noted earlier, the Message Management System 204 may be configured to allow a user to manage the distribution of a message across a large group of possible recipients. In certain circumstances, the members of each such group may speak a different language. As shown in FIG. 18, a user may select from a predefined list of languages to be used when communicating the message. Embodiments of the invention may allow a user to configure the message definition to define a preferred language to be added to the message definition. As illustrated in FIG. 18, a user may be presented with a list of languages to be selected for use with the message definition. Touchpoints for each message may be added as part of the message definition. As illustrated in FIG. 19, a list of touchpoints may be presented to a user for selection 1902. FIG. 20 illustrates a user interface in which a user may select touchpoints to be provided to a message generation vendor. As was noted above, various organizational communications rules may be applicable to a communication. As illustrated in FIG. 21, those rules may be selected and added to a message definition during the definition editing process. As shown in FIG. 22, when a rule has been added, a confirmation dialog box may appear in order to confirm that the user wishes to add the rule to the message definition. Additionally, rules may be edited from the selection list illustrated in FIG. 21. An example of a rule edit user interface is illustrated in FIG. 23. As shown, a DeDup rule may be edited in order for the rule apply to selected variables used in the message definition.

Figure 24:
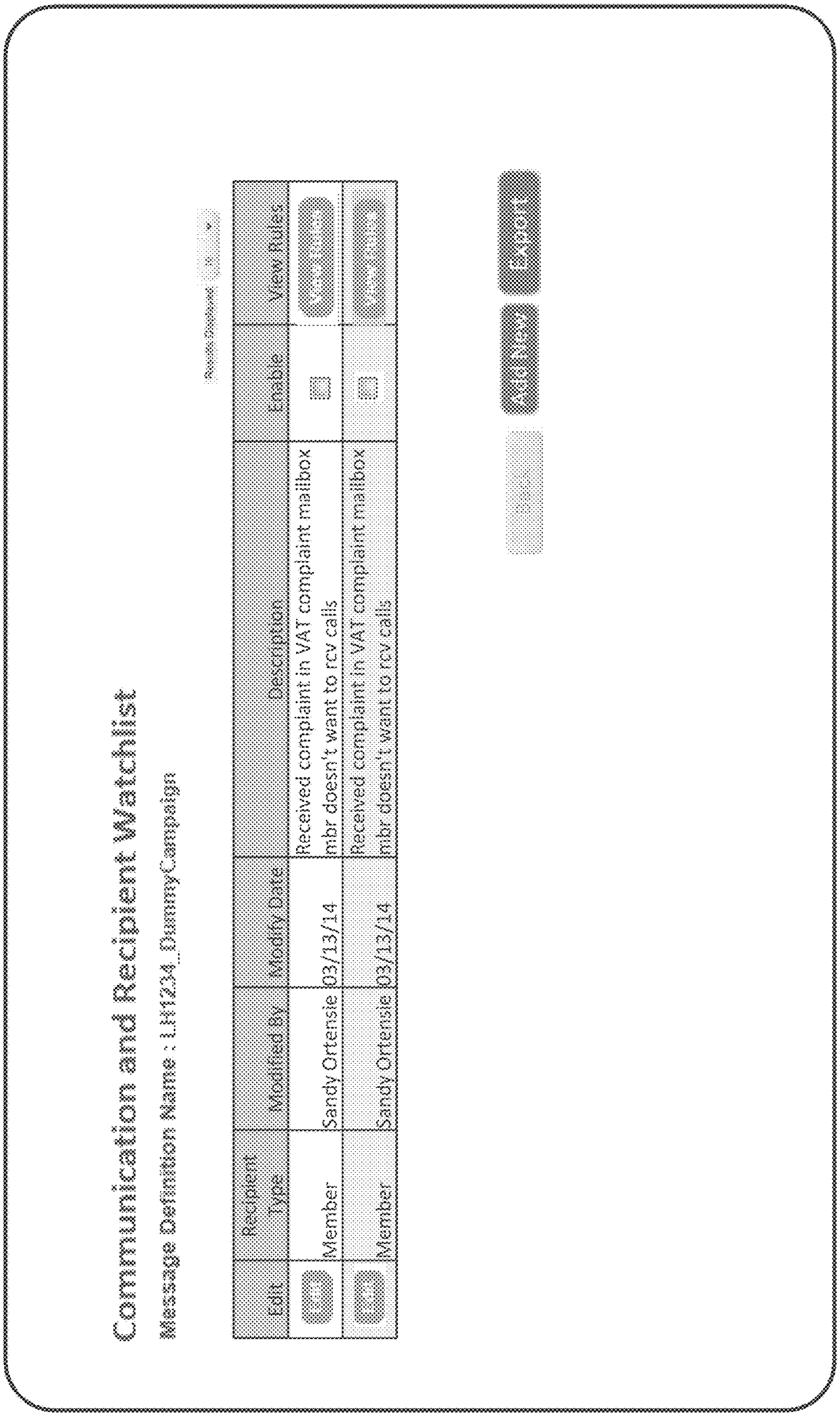
FIG. 24 is a user interface used to edit a watchlist definition in an embodiment of the invention.
Figure 25:
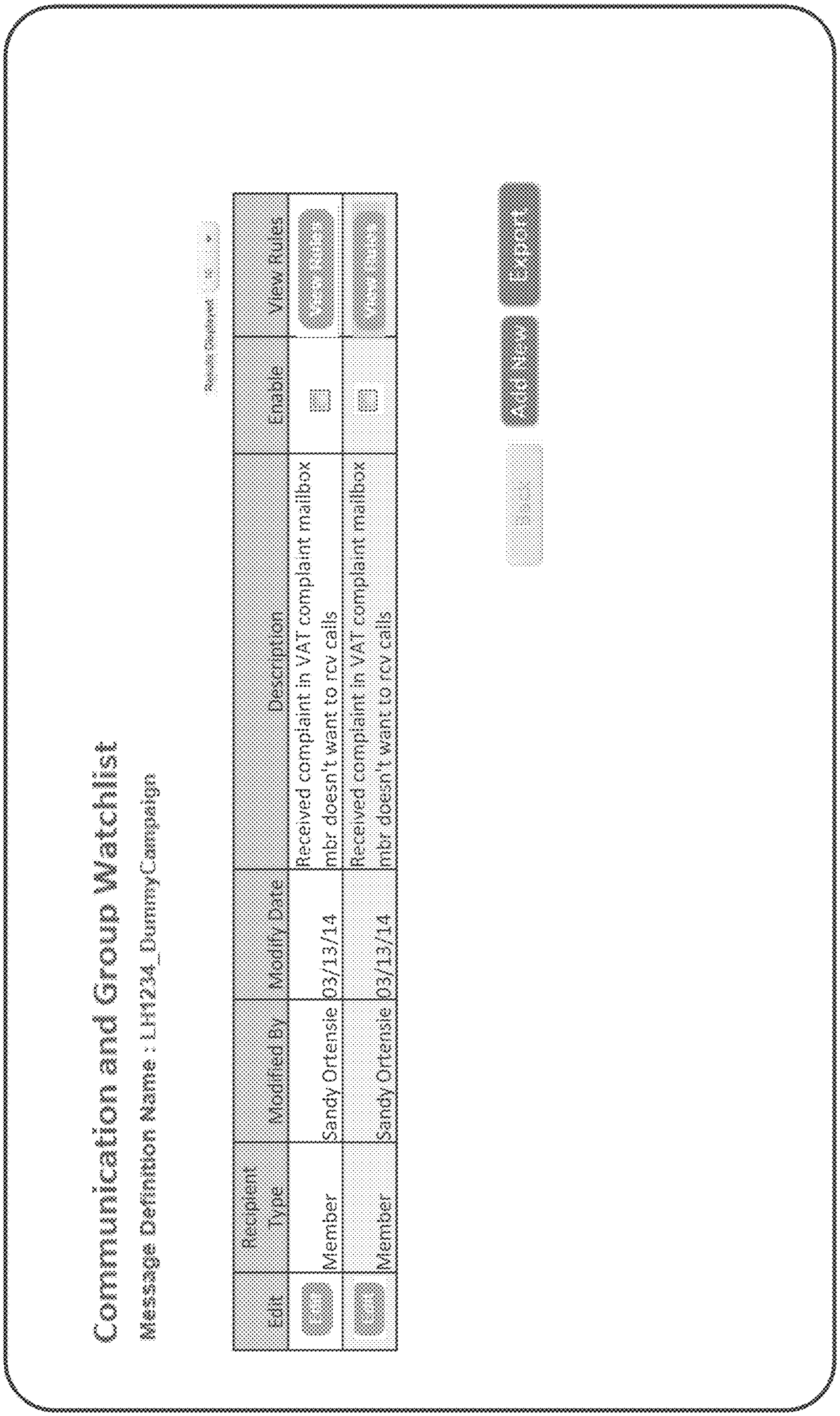
FIG. 25 is a user interface used to edit a watchlist definition in an embodiment of the invention.

Watch lists of work items may be generated by an embodiment of the invention. As illustrated in FIGS. 24 and 25, watch lists may be recipient or group based watch lists. When a user is satisfied with the various message definition entries described above, that user may enable the message as shown in FIG. 24. Once enabled, the message definition may instruct the Message Management System 204 to begin processing messages according the message definition configuration.

Figure 13:
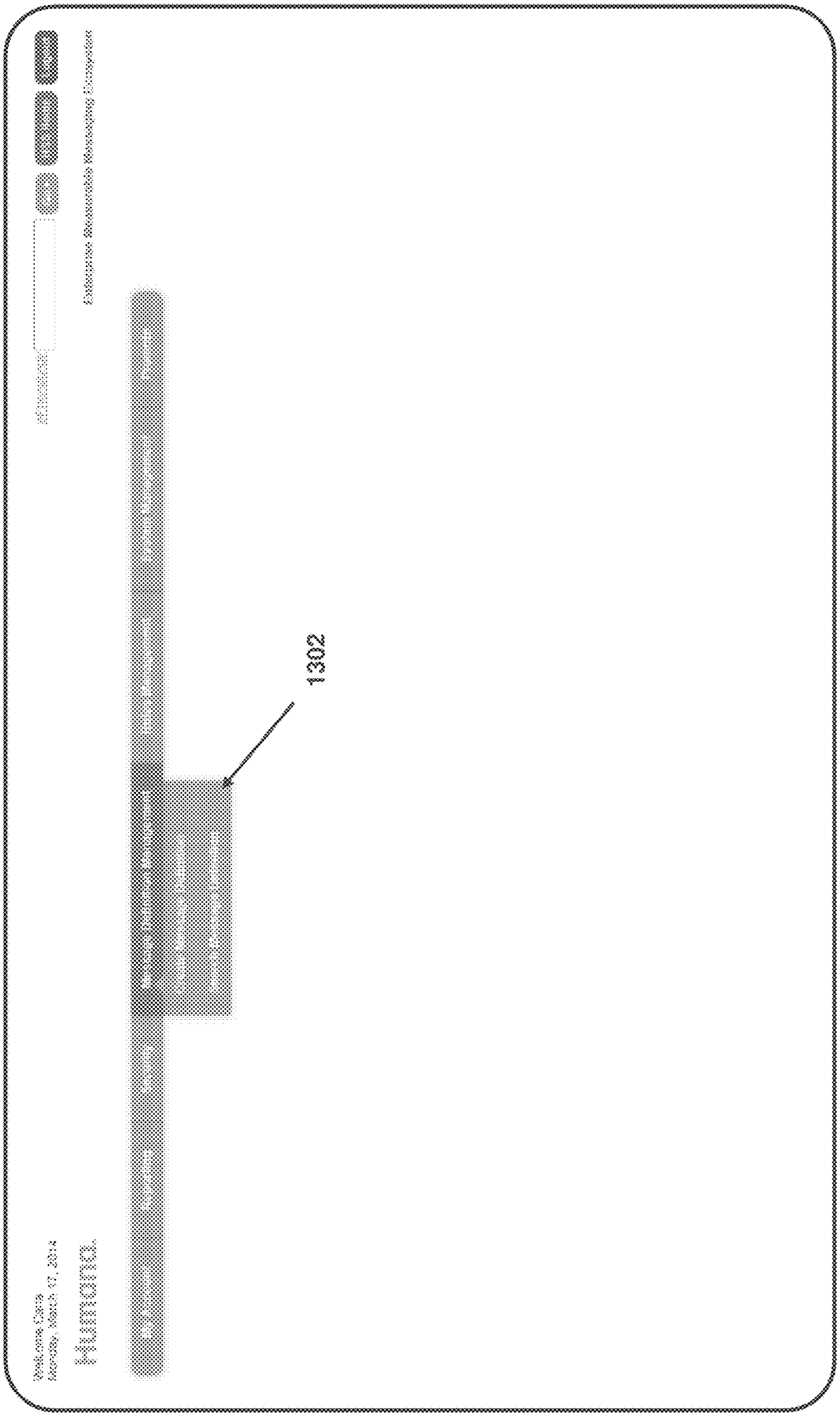
FIG. 13 is a menu used in a user interface of an embodiment of the invention.
Figure 26:
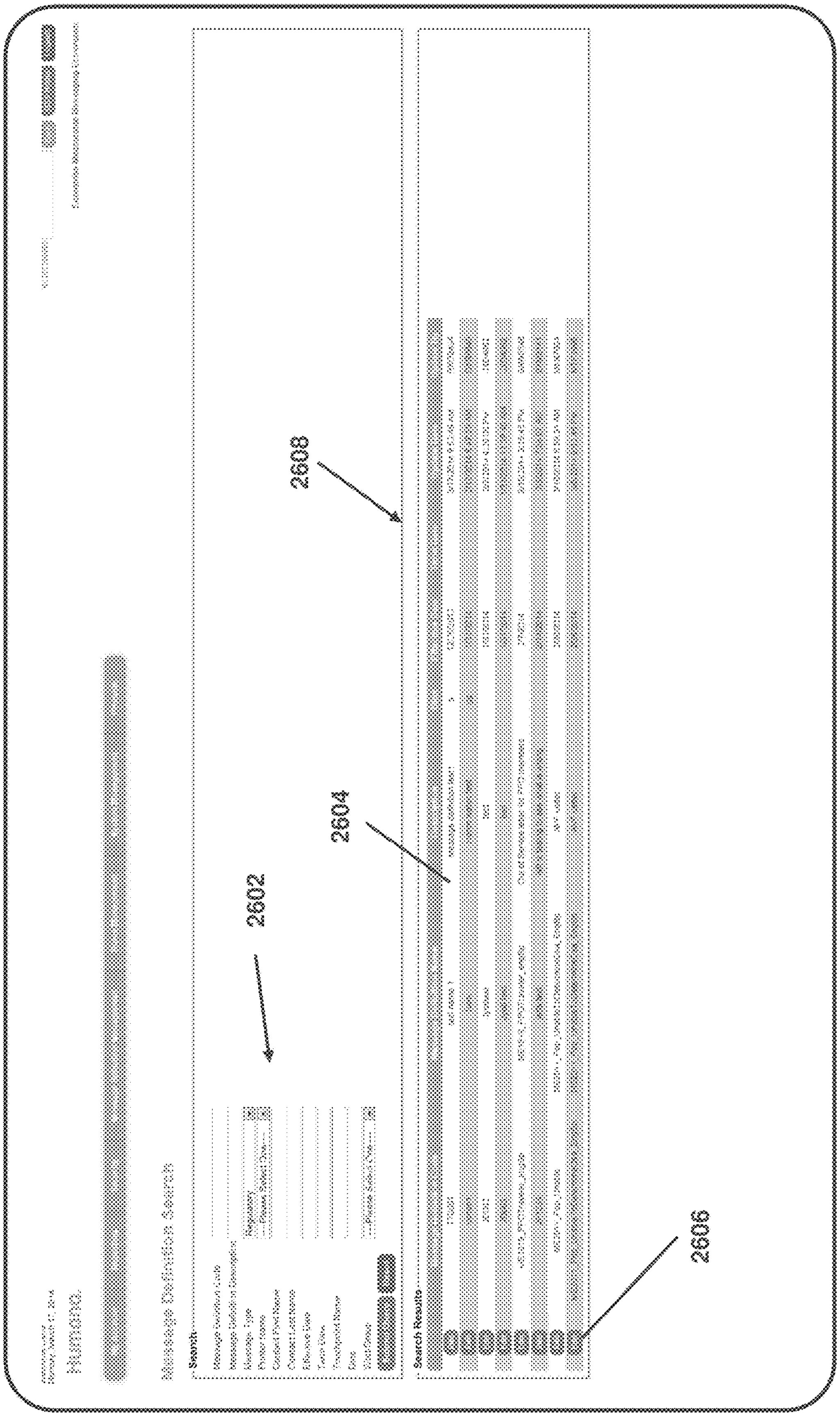
FIG. 26 is a user interface used to search a message definition in an embodiment of the invention.

As is illustrated in FIG. 13, a message definition search function may be selected from the menu dropdown 1302. When a user selects the message definition search menu item, a definition search user interface may be displayed. An example of such a message definition search function is shown in FIG. 26. As with other search user interfaces described herein, the message definition search user interface may comprise a search variable entry section 2602 and a search results display area 2604. As illustrated, such a user interface may provide an edit command 2606 and also display various pieced of information 2608 regarding the message definitions returned as the result of the search.

Figure 27:
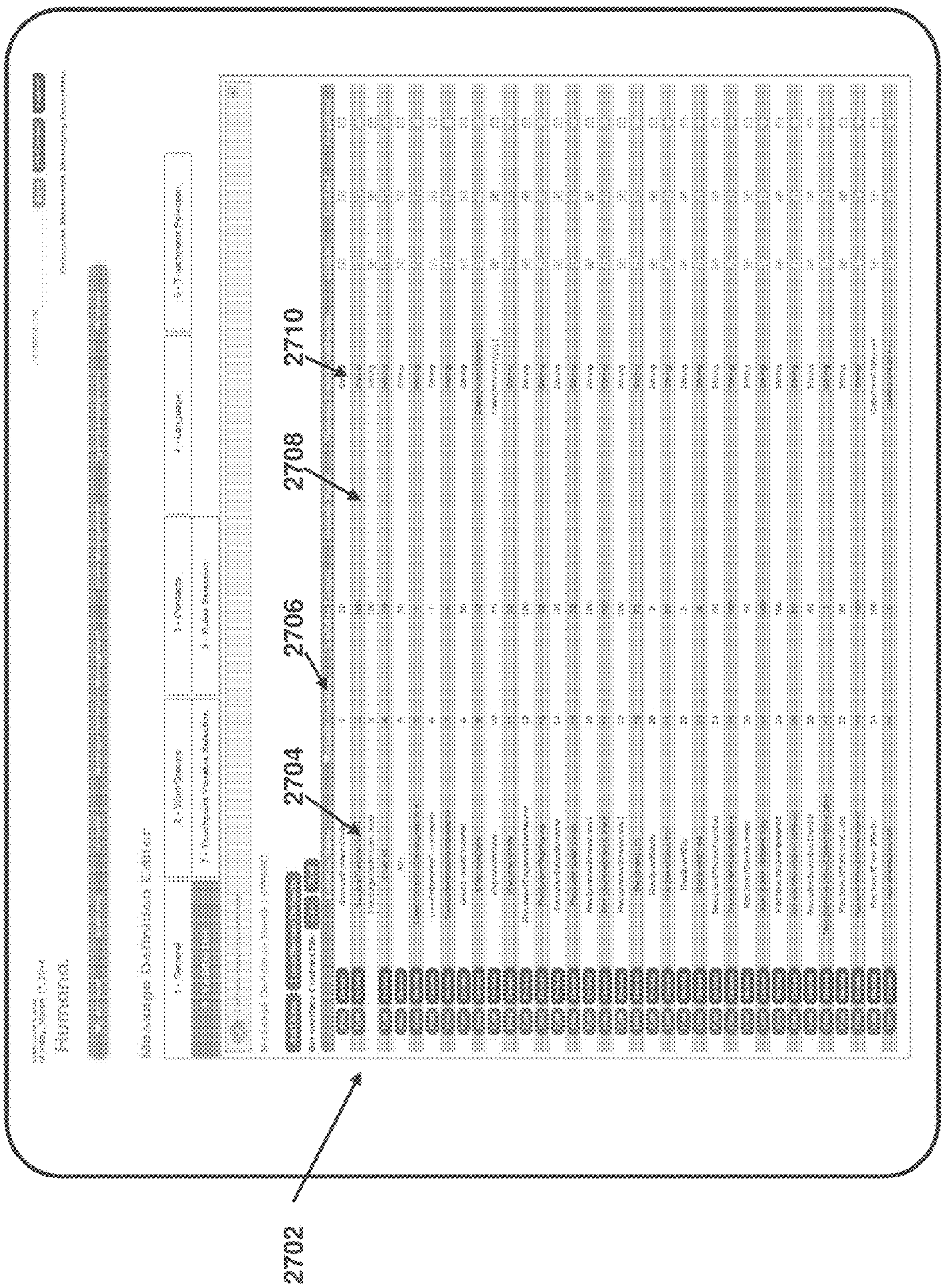
FIG. 27 is a user interface used to edit a message definition in an embodiment of the invention.

In order to personalize or otherwise modify the contact of a message, a series of data fields may be created and positioned within a message template. As illustrated in FIG. 27, these may be referred to as message variables. As is shown, a list of variables 2702 is displayed. Each message variable may have a name 2704, a position 2706, a default value 2708, and a variable format 2710. As shown, the variable format may be a string, data, number, or image. This list is not intended to limit the formats useable by the invention as other variable formats may also be applicable.

Figure 28:
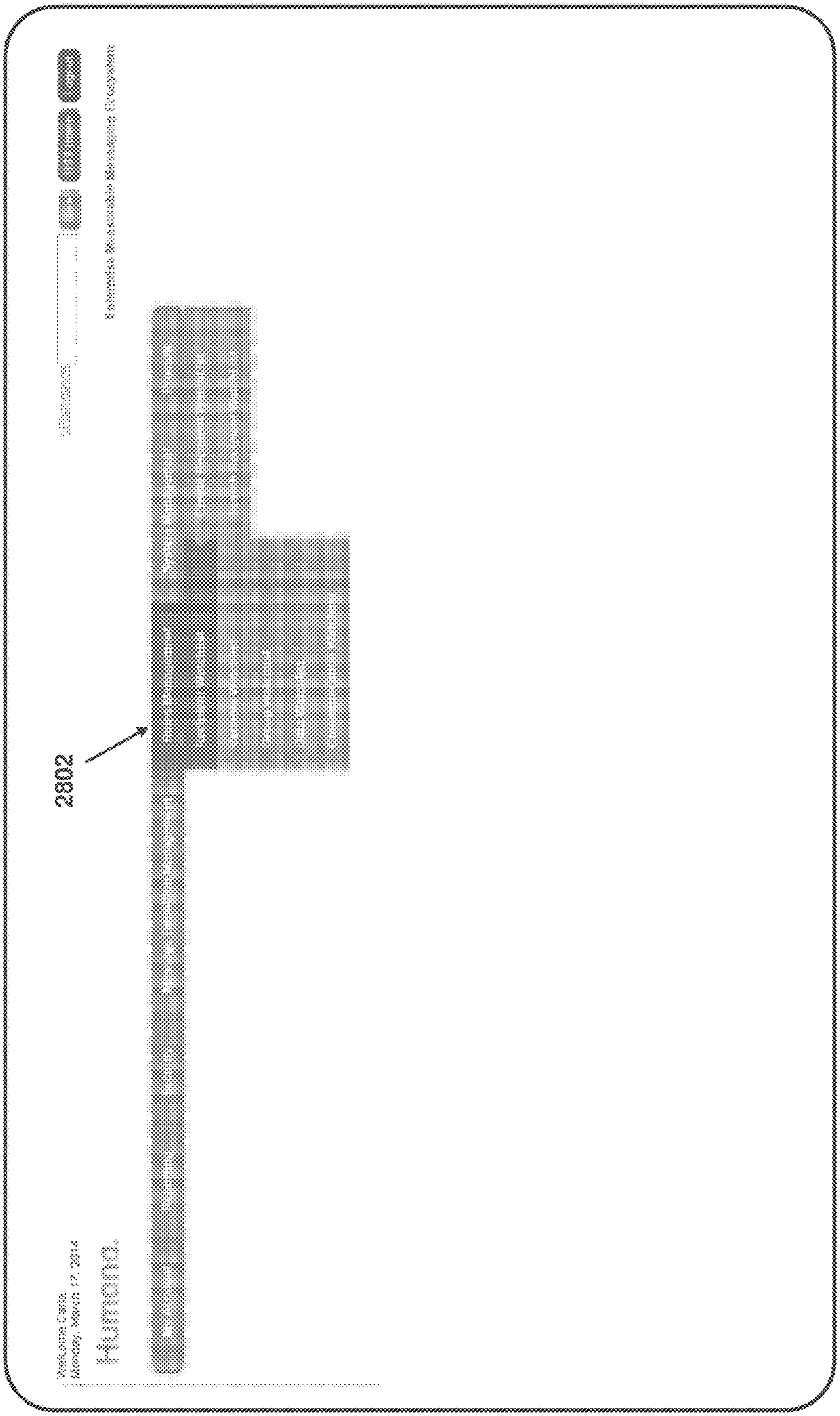
FIG. 28 is a menu used in a user interface of an embodiment of the invention.
Figure 29:
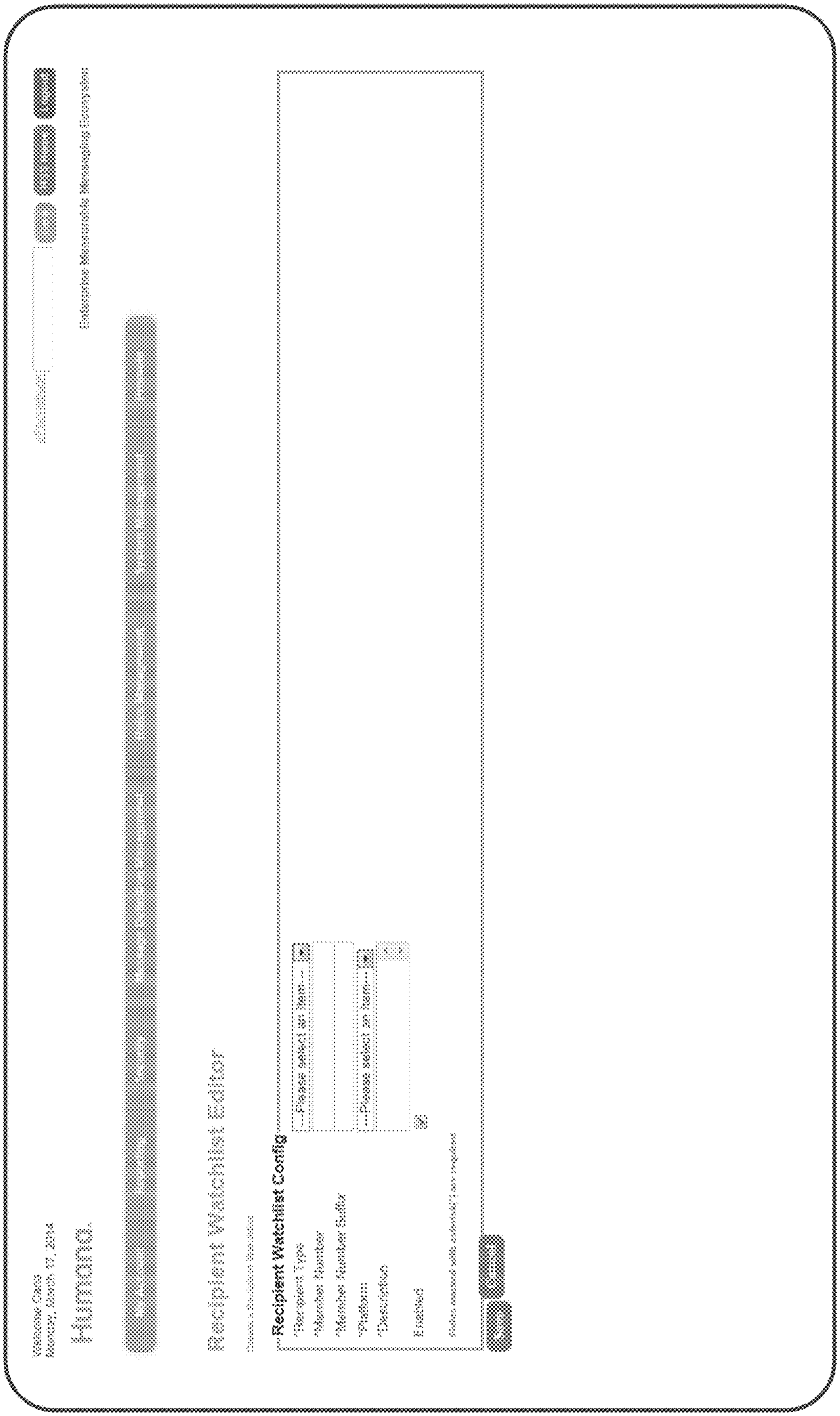
FIG. 29 is a user interface used to edit a watchlist in an embodiment of the invention.
Figure 30:
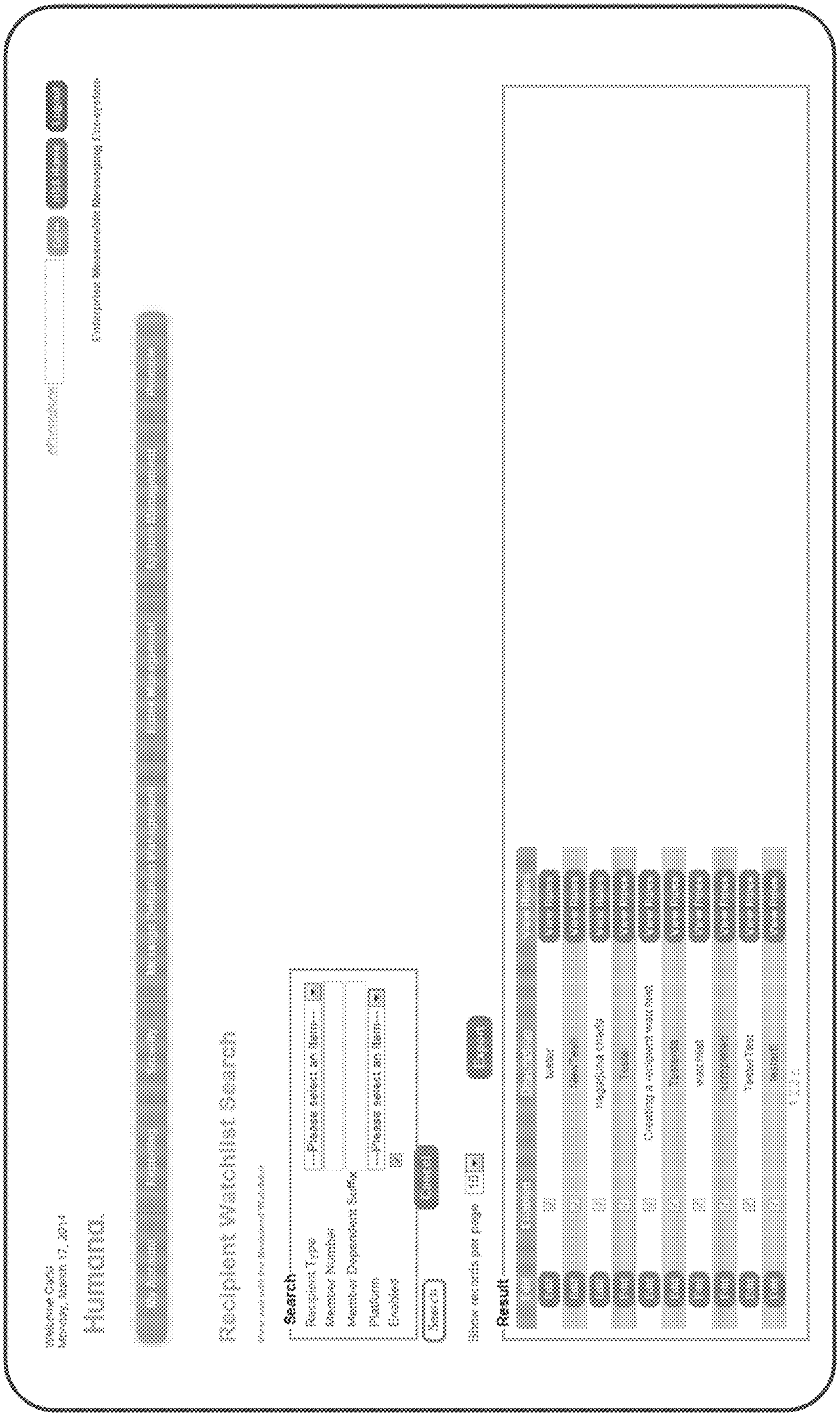
FIG. 30 is a user interface used to search for a watchlist in an embodiment of the invention.
Figure 31:
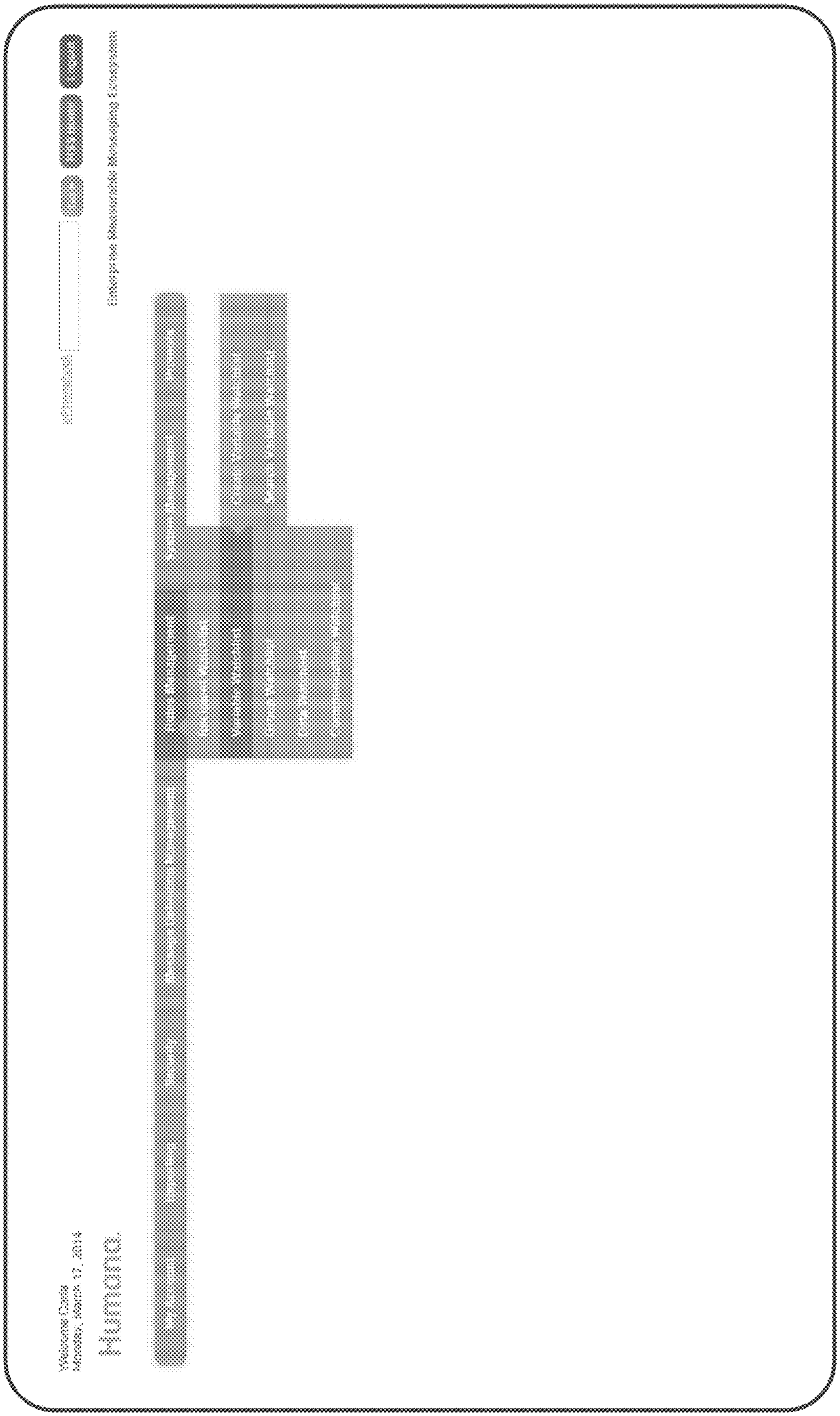
FIG. 31 is a menu used in a user interface of an embodiment of the invention.
Figure 32:
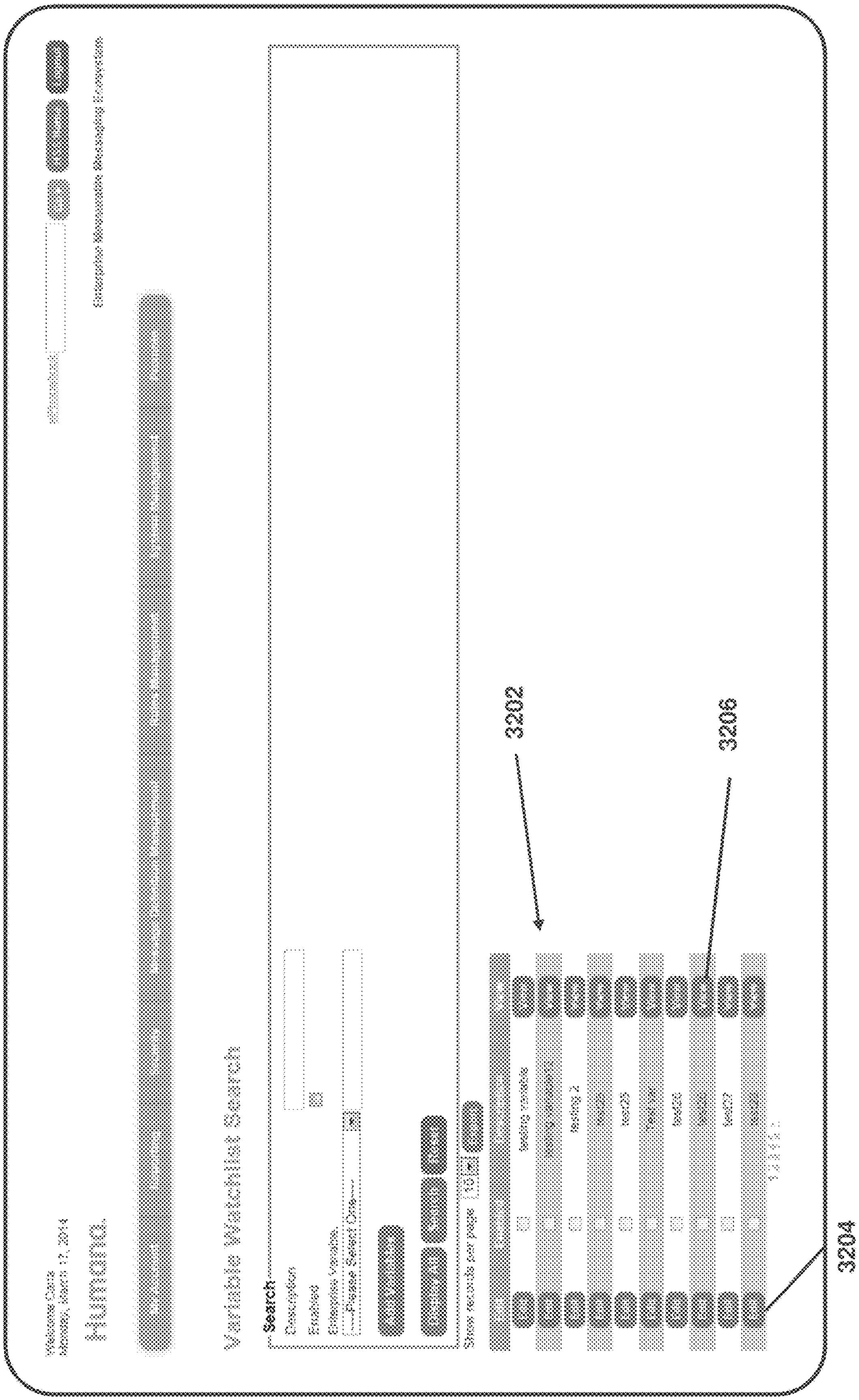
FIG. 32 is a user interface used to search for a watchlist in an embodiment of the invention.
Figure 33:
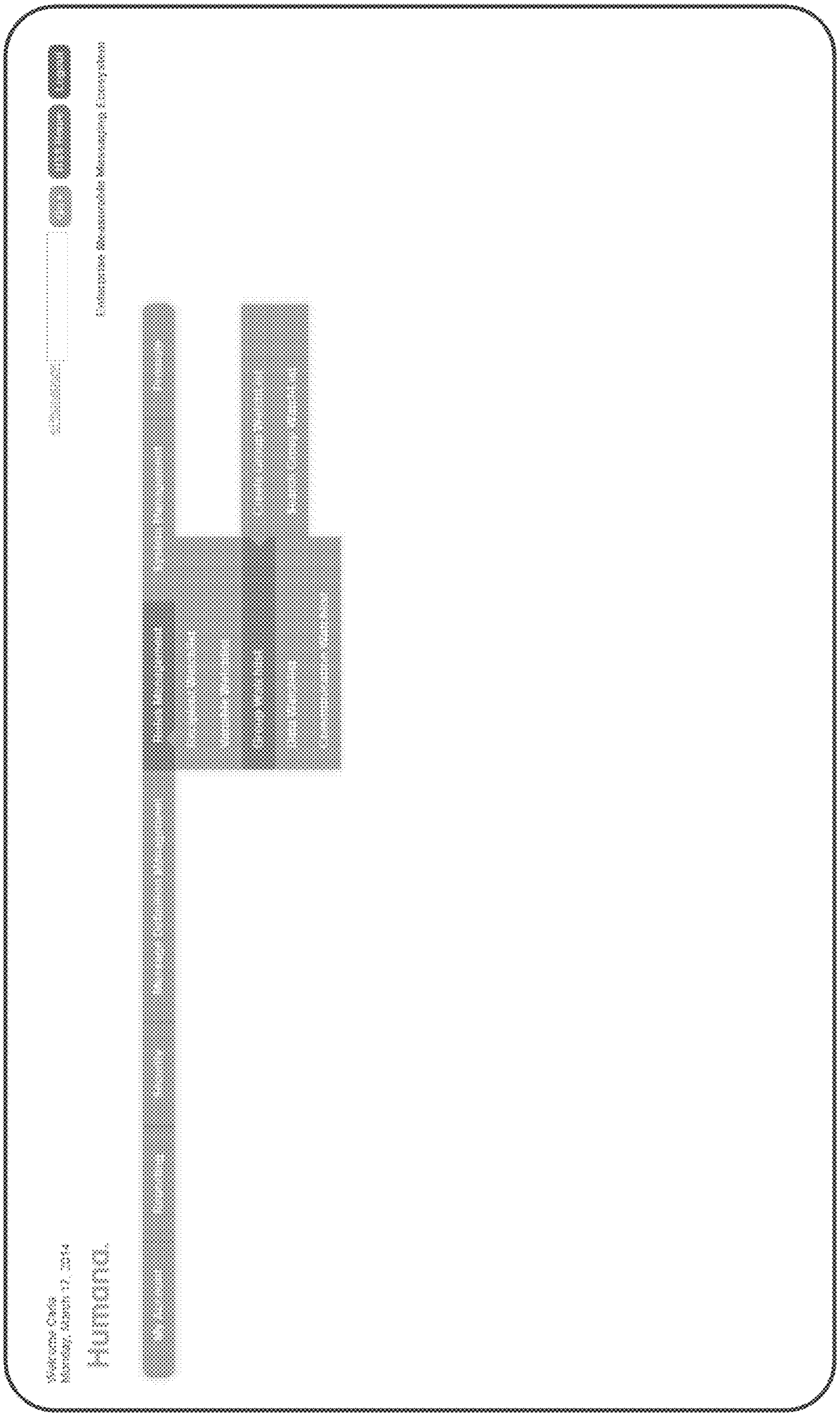
FIG. 33 is a menu used in a user interface of an embodiment of the invention.
Figure 34:
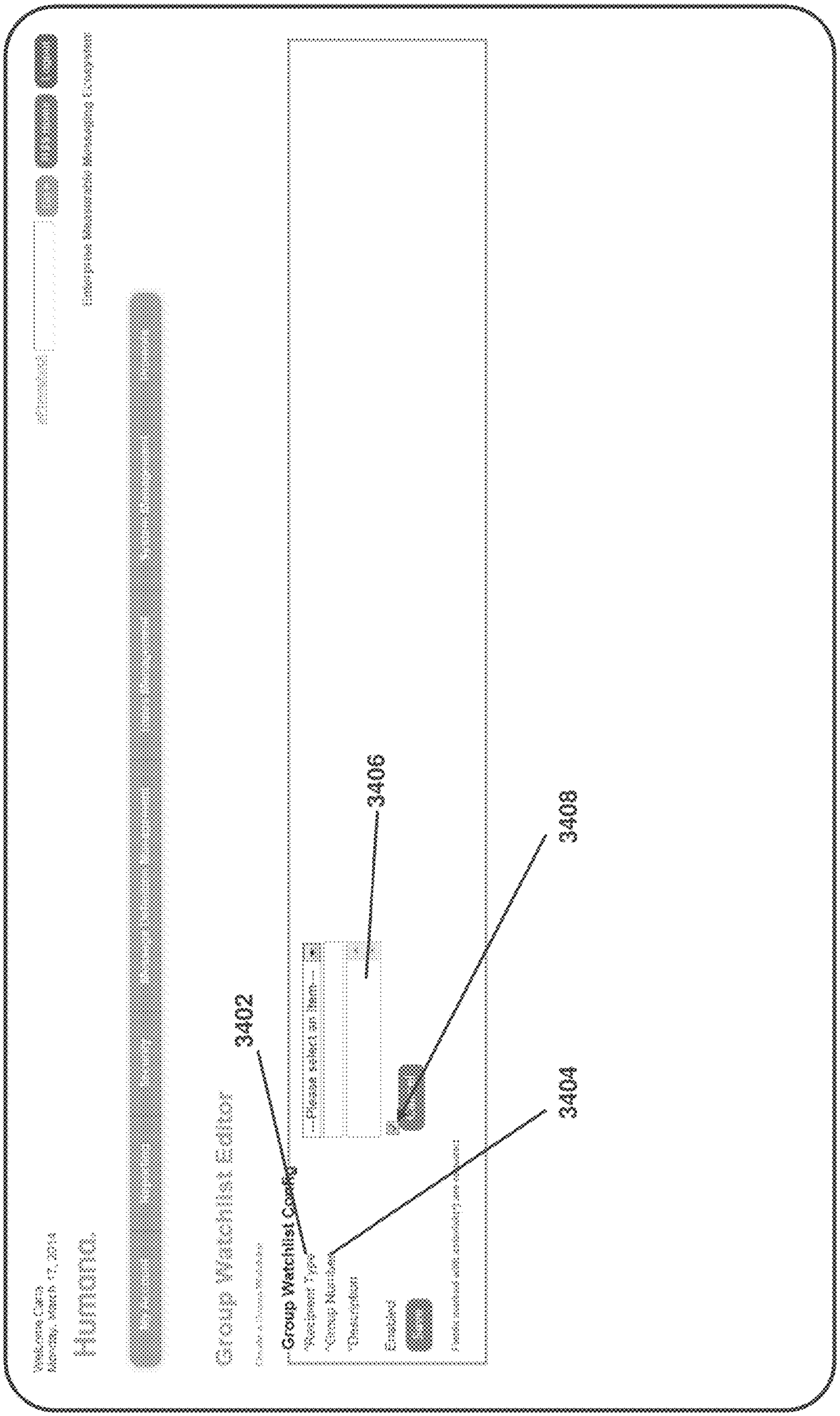
FIG. 34 is a user interface used to edit a watchlist in an embodiment of the invention.
Figure 35:
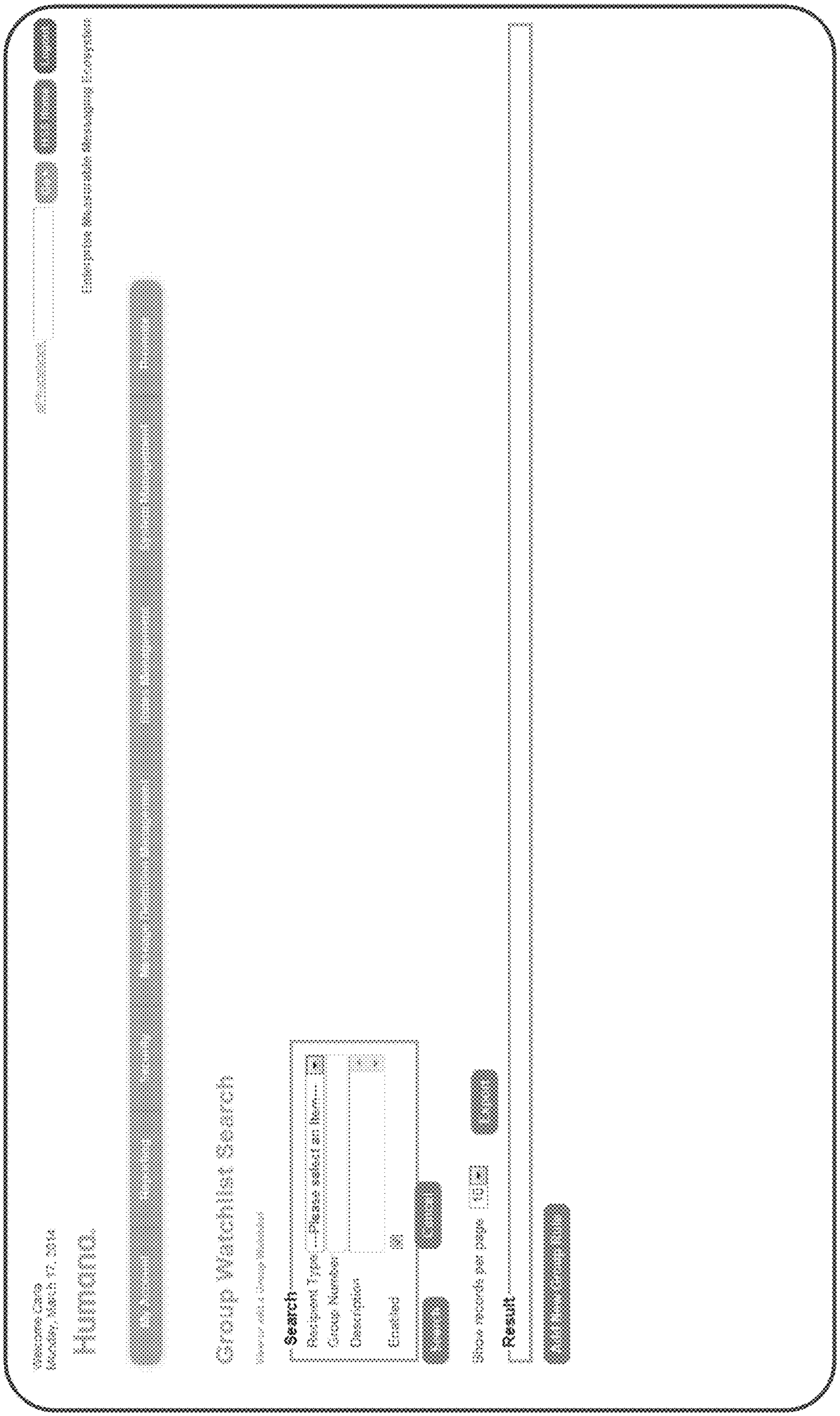
FIG. 35 is a user interface used to search for a watchlist in an embodiment of the invention.

As is shown in the user interface illustrated in FIG. 28, an embodiment of the invention may provide a user with a rules management function 2802. As was described earlier herein, a set of predefined rules may be applied to a communication as it is processes by embodiments of the invention. As is shown, these rules may comprise various watchlists. Illustrated are menu options for recipient, variable, group, data, and communications watchlists. What follows will be a description of various exemplary user interfaces that may be employed by an embodiment of the invention to allow a user to search and configure these watchlists. FIG. 29 illustrates a recipient watchlist editor. When a user has entered the indicated information, the watchlist is enabled and may provide an alert should the recipient information in a message match the watchlist. FIG. 30 represents a recipient watchlist search function. FIG. 31 illustrates a menu for selecting variable watchlist creation or search selections. FIG. 32 shows an example variable watchlist search function. As illustrated, the results of the search 3202 may also include an edit function 3204 and also a view function 3206. FIG. 33 demonstrates a user interface dropdown menu for creating or searching group watchlists. As is illustrated in FIG. 34, a group watchlist may be configured by selecting a recipient type 3402, group number to be monitored 3404 and a description of the watchlist 3406. In addition, a user may be presented with a selection 3408 to enable the watchlist being edited. FIG. 35 illustrates an example embodiment of a group watchlist search function.

Figure 36:
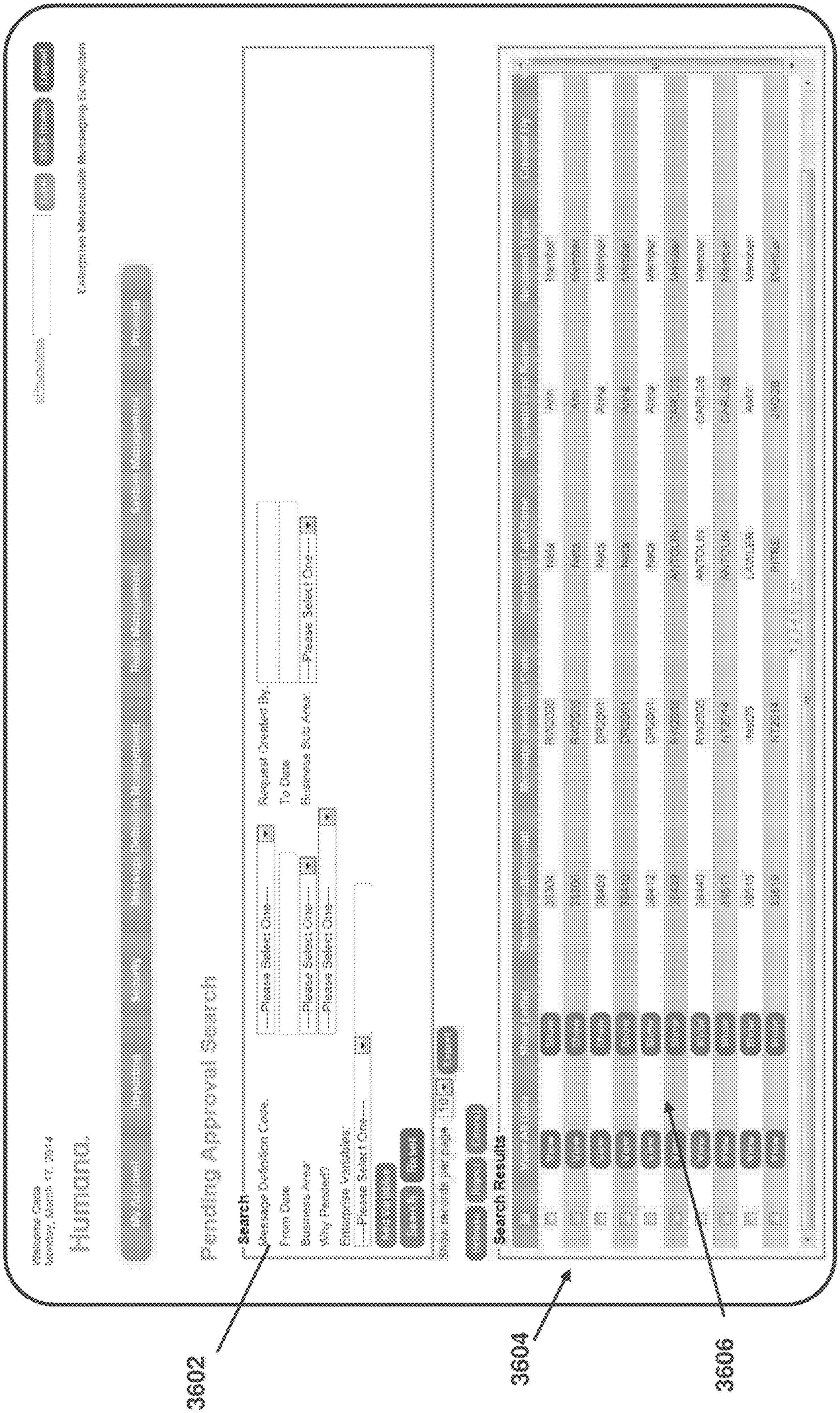
FIG. 36 is a user interface used to search for messages pending approval in an embodiment of the invention.

As is shown in FIG. 4, in an embodiment of the invention, a user may select from a dropdown menu structure 402 which includes options 406 to generate communications messages (letters). Referring again to FIG. 3, after selecting an option to generate a communications message, embodiments of the invention may allow a user to store 304 a message during the creation of such a message in order to allow a user to return at a later time and retrieve the message 306 to continue the editing process. Embodiments of the invention may comprise message sample templates 308 for use by users in the creation of messages. In the case of certain message types, a user may be able to audit a sample of the proposed communications using an audit view function 310. This function may be particularly useful when the message is to be delivered in a hardcopy format such as a letter or statement insert. As is illustrated in FIG. 4, in the drop down menu 404 an embodiment of the invention may provide a user interface to enable a user to interact with the message depot. In embodiments of the invention, a user may perform a historical search of messages and activity of the messaging management system 204 in order to quickly obtain an overall status of messages being managed by the system. Other searches may be more specific in nature. For example, in embodiments of the invention, a user may review the message's compliance with corporate governance standards 312 in a pending approval view. An example of this pending approval view is illustrated in FIG. 36. As can be observed, a user may search pending approvals by entering message characteristics into a search interface 3602. In embodiments of the invention, the result entering such information and selecting a search command may be a list of search results. As is shown, a plurality of messages 3604 may be returned as the result of such a search. Each message listing returned in the search may also comprise selectable controls 3606 that allow the user to retrieve additional information regarding each item. The interface may be configured to allow a user to see a list of work in process communications sent to a recipient or group of recipients.

Referring again to FIG. 3, the interface may also be configured to provide a means 314 of accessing the analytics portions of the message management system 210. Such an interface may also comprise a reporting access function 316 that may be used to track the process of a message introduced into the message management system for delivery. In certain embodiments of the invention, the reporting access function may allow a user to track the delivery of a message to a recipient or group of recipients in a manner similar to what is used by parcel delivery systems. Other functions that may be accessed by such a user interface may be: User account profile setpoints; selection and search reports; administrative reports; reporting history reports; printer configuration; associate use configuration; workgroup definition; message definition selections; recipient watchlists; variable watchlists; create data watchlists; communications watchlists; enterprise variable management; letterheads; business area management; system outage configuration; touchpoint management; system configuration 318; data conversion settings; and updates to system interfaces and toolbars.

Message Analysis

As is illustrated in FIG. 2, Embodiments of the invention may comprise a system for message analysis. This system may also perform a message coordination function 222. Such a coordination function considers business rules 224 and business events 226 to analyze messages stored in the database 214 prior to those messages being processed for fulfillment. Business rules 224 may comprise messaging constraints imposed by the organization. In addition, these business rules may also consider relationships between the organization and the message recipient. In order to derive these business rules, embodiments of the invention may receive operational information regarding the recipient's characteristics and preferences. Recipient preferences may include a recipient's preferred method of communication. As an example, a recipient may have indicated that they prefer emails as opposed to traditional paper mailing delivered by the post office or other delivery service.

As was noted above, users of the messaging management system may be able to configure group watchlists to create notifications before messages are delivered to a specific group. Users may also create recipient watchlists that generate notifications regarding messages that are delivered to specific individuals.

Figure 37:
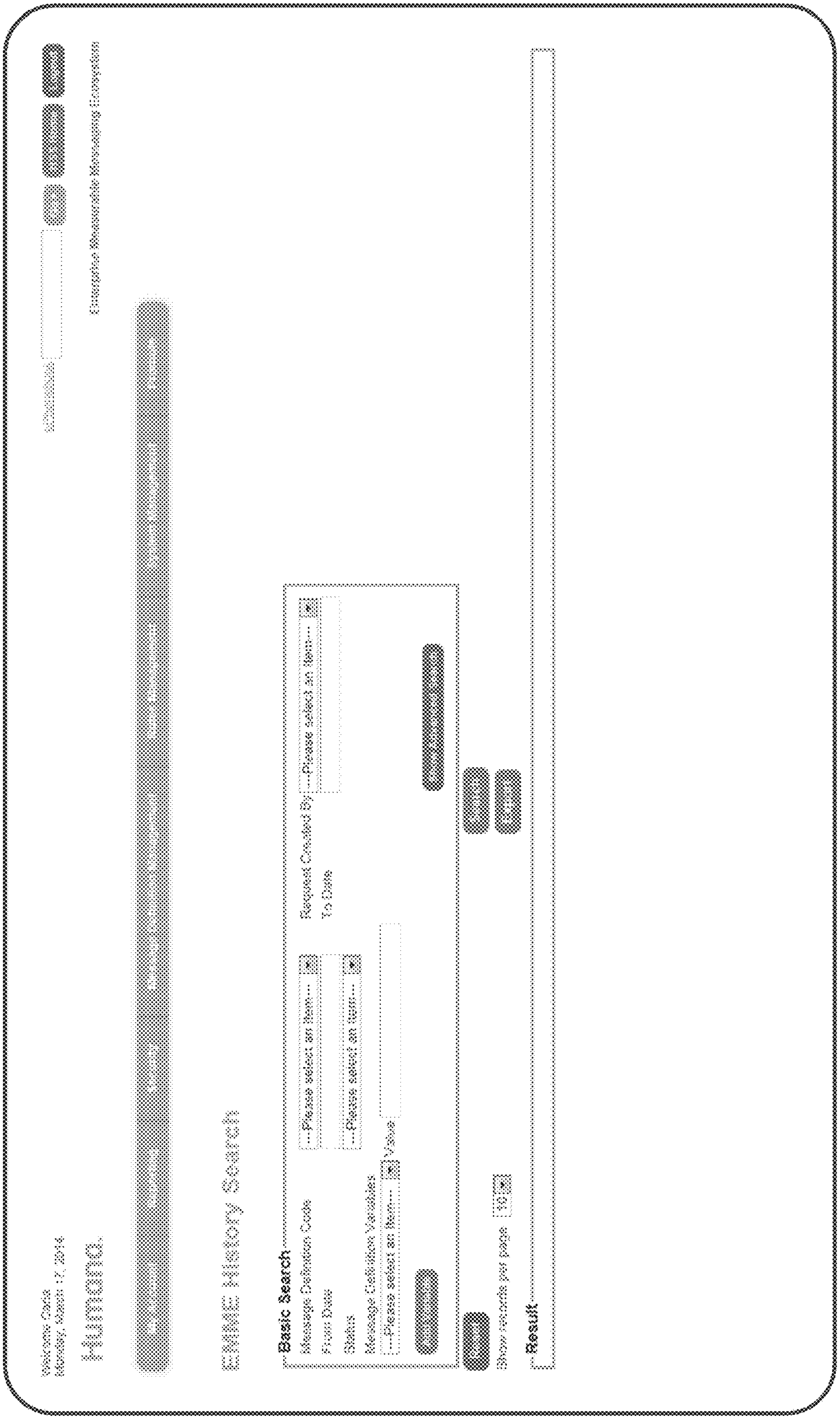
FIG. 37 is a user interface for searching message history in an embodiment of the invention.

In addition to operational views of the recipients, the message analysis portion of the invention may receive operational messaging history 228. An example of a user interface for such a messaging history analysis is illustrated in FIG. 37. For example, messaging history information may be provided to the business events portion of the message analysis and include information related to past communications and the reaction of recipients to those communications. The message analysis system may process messages from the database 214 using business rules and business event data to coordinate the various messages contained in the database before providing those messages to the delivery functionality comprised by the system. This coordination may perform functions such as consolidating duplicate messages, resolving or flagging conflicts in message content and determining the most effective communications channels based upon prior messaging results.

Message Fulfillment Hub

An embodiment of the invention may comprise a message fulfillment hub which coordinates the creation and delivery of individual messages directed to one or more groups of recipients. As is illustrated at 230 in FIG. 2, once a message has been analyzed by the message analysis portion 216 of the invention and any adjustments or revisions made to the message as the result of that analysis, the message may be provided to the message fulfillment hub 230. This hub may provide the interface between the message management system and various communications system resources 206 used to produce and deliver messages across a plurality of channels 208. The message management system 204 may comprise a service registry 232 which contains information necessary to identify and utilize available communications system resources 206. This may also enable a user to create message content without having to address multiple message layout configurations implemented by different communications system resources. For example, messages sent by text message or email may not require embedded graphics and certain legal information but may require that certain information be made available to the recipient via hyperlinks, prerecorded messages, or other repositories of information. In addition to layout, embodiments of the invention may be configured to deliver to the message fulfillment hub any additional information needed to fulfill a message. For example, email messages require email address data, whereas messages printed and delivered by regular mail require street address data. The message management system may be configured to determine the required delivery method of a particular message and assemble the necessary data required for delivery of that message according to the desired delivery method. The message management system may also be configured to leverage multiple communications system resources according to cost sensitivity or urgency of the communication to be delivered. These resources may be internal to an organization or may be external vendors. In an embodiment in which multiple communications system resources are available, the invention may be able to recycle to a second resource if the initially selected resource becomes unavailable or unable to fulfill the message as desired by a user of the invention.

Message Archiving and Analysis

Referring again to FIG. 2, the message management system 204 may also comprise systems for archiving and retrieval of message content 234. Such a system may be used by the operational messaging history system 228 to maintain a record of message content and recipient reaction as was described earlier. Such systems may be configured to retain message history for several years to satisfy regulatory requirements. For example, an embodiment of the invention may be configured to archive message data and images for a period of ten years.

In certain circumstances, users of the message management system may wish to analyze message data such as, but not limited to, response rates and delivery costs. Message information may be gathered from the message fulfillment hub for processing by an analytical contact history function 236 as well as an analytical reporting function 238. These functions may be used to provide messaging effectiveness, cost, or recipient satisfaction data to users or groups within the organization to assist in the determination of what types of messaging to provide going forward.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for managing computerized messages for an organization comprising:

a message depot comprising an interface configured to electronically receive and at least temporarily store proposed messages generated at one or more user systems associated with one of more groups within the organization, wherein each proposed message comprises content data and one or more characteristics;

a communication governance database comprising governance rules for messages produced by the organization, wherein at least some of said governance rules are associated with one or more message formats;

a message fulfillment system comprising software instructions, which when executed, configure the message fulfilment system to convert the content data of each of said proposed messages into at least two different formats and transmit the formatted messages to one or more fulfillment providers for transmission to a number of predetermined recipient systems;

a message archival system comprising one or more electronic storage devices; and one or more computer servers comprising software instructions, which when executed, configure each of the one or more computer servers to, for each respective one of the proposed messages:

generate a template based on the one or more characteristics of the respective proposed message;

populate said template with the content data for the respective proposed message;

apply said governance rules to the content data of the respective proposed message;

where a lack of compliance with one or more of said governance rules is found:

generate feedback data indicating said lack of compliance;

provide a notification at the user system which generated the respective proposed message with the feedback data;

receive, from the user system which generated the proposed messages, modifications to the content data of the respective proposed message which address said feedback data or a user override of the feedback data;

provide the respective proposed message to the message fulfilment system for conversion into the at least two different formats and transmission to the number of predetermined recipient systems; and store at least the content data for the respective proposed message at said message archival system.

2. The system of claim 1 further comprising:

a message analytics engine comprising software instructions, which when executed, configure the message analytics engine to analyze the content data for the proposed messages stored at said message archival system and generate an alert where content data is found which violates one or more business rules.

3. The system of claim 2 wherein:

said one or more business rules comprise communication preferences provided by the predetermined recipient systems.

4. The system of claim 1 further comprising:

a message analytics engine comprising software instructions, which when executed, configure the message analytics engine to analyze contact history of the content data of the proposed messages stored at said message archival system and produce message data representing effectiveness, response rates, delivery costs, and recipient satisfaction.

5. The system of claim 1 wherein:

said characteristics are selected from the group consisting of: a workgroup, a recipient class, a language selection, a definition of message variables, and a selection of applicable rules.

6. The system of claim 5 wherein:

said recipient class is selected from the group consisting of: customers, employers, brokers, employees, and health plan members.

7. The system of claim 1 wherein:

the one or more computer servers comprise additional software instructions, which when executed, configure the one or more computer servers to, for the given message, prevent the message from being provided to the message fulfillment system unless a user override is received or the content data complies with the feedback data.

8. The system of claim 1 wherein:

said formats are selected from the group consisting of: web content format, mobile device format, social media post format, voice communication systems format, postal mail format, email format, fax format, customer resource management system format, and fax communication system format.

9. The system of claim 1 wherein:

the governance rules comprise sending said proposed messages in a mobile device format only during time periods associated with normal business hours for a location associated with a respective one of the number of predetermined recipient systems.

10. A system for managing computerized messages for an organization comprising:

a message depot comprising an interface configured to electronically receive and at least temporarily store proposed messages, each generated at one or more user systems by one or more users associated with one or more groups within the organization, wherein each proposed message comprises content data and one or more characteristics selected from the group consisting of: a workgroup, a recipient definition, a language selection, a definition of message variables, and a selection of applicable rules;

a communication governance database comprising governance rules for messages produced by the organization, wherein at least some of said governance rules are associated with one or more message formats;

a message fulfillment system comprising software instructions, which when executed, configure the message fulfilment system to convert the content data of each of said proposed messages into at least two different formats selected from the group consisting of: web content format, mobile device format, social media post format, voice communication systems format, postal mail format, email format, fax format, customer resource management system format, and fax communication system format, and transmit the formatted message content data to fulfillment providers for transmission to each of a number of predetermined recipient systems;

a message archival system comprising one or more electronic storage devices configured to archive each of the proposed messages provided to said message fulfilment system;

one or more servers comprising software instructions, which when executed, configured the one or more servers to, for each respective one of the propose messages:

generate a template based on the characteristic for the respective proposed message;

populate said template with the content data for the respective proposed message;

apply said governance rules to the content data of the respective proposed messages;

where said respective proposed message fails to comply with one or more of said applied governance rules:

generate message content feedback data;

generate a notification at the user system associated with the respective proposed message of the message content feedback data;

generate a prompt at the user system associated with the respective proposed message to either override the message content feedback data or modify the content data to comply with the message content feedback data;

provide the respective proposed messages to the message fulfilment system for conversion and transmission to the number of predetermined recipients; and store the respective proposed message at the message archival system; and a message analytics engine comprising software instructions, which when executed, configure the message analytics engine to analyze each of the proposed messages stored at said message archival system, generate an alert for each of said proposed messages violating a business rule, and produce data representing the effectiveness of the transmitted messages.

* * * * *

UNITED STATES PATENT AND TRADEMARK OFFICE

CERTIFICATE OF CORRECTION

PATENT NO. : 11,017,356 B2
APPLICATION NO. : 16/380342
DATED : May 25, 2021
INVENTOR(S) : Fehling It is certified that error appears in the above-identified patent and that said Letters Patent is hereby corrected as shown below:

In the Claims

Claim 10, Column 14, Line 17:
Delete “propose” and insert --proposed--.

Signed and Sealed this
Third Day of August, 2021

Drew Hirshfeld
*Performing the Functions and Duties of the Under Secretary of Commerce for Intellectual Property and Director of the United States Patent and Trademark Office*